United States Patent
Kim et al.

(10) Patent No.: US 10,425,241 B2
(45) Date of Patent: Sep. 24, 2019

(54) ELECTRONIC DEVICE, SMART HOME SYSTEM USING ELECTRONIC DEVICE, AND METHOD FOR CONTROLLING SMART HOME SYSTEM

(71) Applicant: LG ELECTRONICS INC., Seoul (KR)

(72) Inventors: Hyongguk Kim, Seoul (KR); Junho Kim, Seoul (KR); Sungkwon Jang, Seoul (KR); Kyoungtae Kim, Seoul (KR); Hyunsuk Jung, Seoul (KR); Yeongnam Ahn, Seoul (KR); Gyujung Kim, Seoul (KR); Jiyoung Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 32 days.

(21) Appl. No.: 15/738,783

(22) PCT Filed: Aug. 31, 2015

(86) PCT No.: PCT/KR2015/009159
§ 371 (c)(1),
(2) Date: Dec. 21, 2017

(87) PCT Pub. No.: WO2016/208811
PCT Pub. Date: Dec. 29, 2016

(65) Prior Publication Data
US 2018/0183622 A1 Jun. 28, 2018

(30) Foreign Application Priority Data

Jun. 24, 2015 (KR) .......... 10-2015-0089916
Jun. 24, 2015 (KR) .......... 10-2015-0089943

(51) Int. Cl.
*H04L 12/28* (2006.01)
*H04L 12/12* (2006.01)
*H04W 88/02* (2009.01)

(52) U.S. Cl.
CPC .......... *H04L 12/2803* (2013.01); *H04L 12/12* (2013.01); *H04L 12/28* (2013.01); *H04L 12/2823* (2013.01); *H04W 88/02* (2013.01)

(58) Field of Classification Search
CPC . H04L 12/2803; H04L 12/2823; H04L 12/12; H04L 12/28; H04W 88/02
See application file for complete search history.

(56) References Cited

U.S. PATENT DOCUMENTS

2014/0375428 A1* 12/2014 Park .................. G06K 7/10237
340/10.1
2016/0349885 A1* 12/2016 Kang ..................... A45C 11/00

FOREIGN PATENT DOCUMENTS

CN 2582072 Y 10/2003
KR 10-2009-0046617 A 5/2009
(Continued)

*Primary Examiner* — Afshawn M Towfighi
(74) *Attorney, Agent, or Firm* — Birch, Stewart, Kolasch & Birch, LLP

(57) ABSTRACT

The present invention relates to a smart home system and an electronic device for establishing the same. An electronic device according to the present invention comprises: a body part having an electric circuit; a wireless communication unit included in the body part; a sensor unit which is mounted on the body part and sensed at least one object to be sensed; a cover part detachably coupled to the body part so as to cover at least a part of the body part and electrically connected to the electric circuit; and a control unit for controlling the wireless communication unit to transmit, to an external device, a radio signal according to a resistance value formed by the coupling of the cover part and sensing information sensed through the sensor unit.

19 Claims, 21 Drawing Sheets

(56) References Cited

FOREIGN PATENT DOCUMENTS

| | | |
|---|---|---|
| KR | 10-2013-0001127 A | 1/2013 |
| KR | 10-2014-0025933 A | 3/2014 |
| KR | 10-2015-0066832 A | 6/2015 |
| WO | WO 2015/080344 A1 | 6/2015 |

* cited by examiner

FIG. 10B

| HOUSE CARE | FAMILY CARE | CONVENIENCE | SECURITY | ENERGY SAVING |
|---|---|---|---|---|
| AIR QUALITY CONTROL<br>-INDOOR AIR QUALITY DETECTION AND ALERTING (FINE DUST, SICK HOUSE SYNDROME, ETC.)<br>-CONTROL LINKED TO WEATHER AND HOME APPLIANCES | ELDERLY CARE<br>-ACTIVITY TRACKING AND ABNORMALITY ALERTING (DIET, ACTIVITY LEVELS, FALLING, ETC.)<br>-IN-HOME ENVIRONMENT AND ACTIVITY MANAGEMENT HOME APPLIANCE USE | HOME APPLIANCE USE<br>-HOME APPLIANCE'S STATUS ALERTING (END OF WASH, OPENING OF FRIDGE, ETC.)<br>-SITUATION-BASED SUGGESTION TO USE HOME APPLIANCES | INTRUSION DETECTION<br>-INTRUSION DETECTION AND ALERTING WHEN YOU ARE NOT AT HOME<br>-SETTING UP A HOME APPLIANCE-BASED METHOD AND MODE<br>-ENTRY AND EXIT MONITORING | AUTOMATIC POWER CONTROL<br>-POWER CONTROL OF HOME APPLIANCES NOT IN USE<br>-INTELLIGENT SMART PLUGS |
| COMFORT CONTROL<br>-TEMPERATURE AND HUMIDITY DETECTION AND ALERTING<br>-INTEGRATED CONTROL BASED ON THE USER'S STATUS (SLEEPING, EXERCISING, COOKING) | BABY/KID CARE<br>-ENTRY AND EXIT CONTROL AND ABNORMALITY ALERTING<br>-ASSISTANCE TO ACTIVITIES (PHYSICAL ACTIVITIES, PREPARATION OF MATERIALS, ETC.) | HOME APPLIANCE CONTROL<br>-MANUAL HOME APPLIANCE CONTROL<br>-USER-CUSTOMIZED INTEGRATED CONTROL (MODES FOR WHEN YOU GET HOME, GO OUT, SLEEP, AND WANT TO SAVE ENERGY) | KEEPING VALUABLES<br>-MONITORING OF ABNORMALITIES IN VALUABLES AND STORAGE SPACE<br>- MONITORING OF A PRIVATE SPACE | ENERGY SAVING<br>-ANALYZING THE PATTERN OF USE OF HOME APPLIANCES AND SUGGESTING WAYS TO SAVE ELECTRICITY |
| HAZARDOUS GAS CONTROL<br>-HAZARDOUS GAS DETECTION AND ALERTING<br>-CONTROL LINKED TO HOME APPLIANCES | INDOOR EXERCISE<br>-EXERCISE REMINDING AND ACTIVITY LEVEL TRACKING)<br>-RESULT REPORTING AND EXERCISE RECOMMENDATION<br><br>PET CARE<br>-PET MONITORING AND REMINDING (ACTIVITY LEVEL, FEEDING, PLAYING, ETC.) | REMINDER<br>-REMINDING THE USER TO MAKE SURE TO CARRY SOMETHING IMPORTANT)<br>- OBJECT SEARCH | FIRE/DANGER PREVENTION<br>-FIRE HAZARD PREVENTION AND HOME APPLIANCE CONTROL<br>- ALERTING TO A FIRE IN A NEARBY AREA | ENERGY USE REPORTING<br>-COMPARISON BY PERIOD AND USER<br>- ANALYZING AND REPORTING AN ABNORMAL PATTERN OF USE |

FIG. 11A (a) [INFORMATION SETTINGS] 151

COMPLETION OF SERVICE REGISTRATION

YOU WILL BE INFORMED OF HOW THE WASH IS PROGRESSING BY SETTING THE ALARM.

WHAT IS THE NAME OF YOUR WASHING MACHINE?

WHAT WOULD YOU LIKE TO KNOW?
☐ WASHING TIME  ☐ END OF WASH

SET THE ALARM
FREQUENCY OF ALARM [ONLY ONCE▽]
UNTIL LAUNDRY IS COLLECTED
RECEIVE THE ALARM
SHARE THE ALARM

SERVICE INFORMATION/ALARM /CONNECTION OF DEVICES (b) [COMPLETION OF SERVICE REGISTRATION] 151

COMPLETION OF SERVICE REGISTRATION

YOU WILL BE INFORMED OF HOW THE WASH IS PROGRESSING BY

SENSOR SETTINGS ARE COMPLETED.

YOU WILL RECEIVE THE ALARM WHEN THE WASH IS COMPLETED.

OK

SET THE ALARM
FREQUENCY OF ALARM [ONLY ONCE▽]
UNTIL LAUNDRY IS COLLECTED
RECEIVE THE ALARM
SHARE THE ALARM

COMPLETION OF CONNECTION OF SENSOR AND SERVICE

*FIG. 11B*

RECOGNIZE INFORMATION ON SENSOR
AND LET THE USER IMMEDIATELY
USE RELATED SERVICES

Miss G

| TEMPERATURE | HUMIDITY | INDOOR AIR |
|---|---|---|
| 28°C | 68% | Good |
| HOME APPLIANCES /OTHER GOODS | MY FAMILY | MY HOUSE |
| INTRUSION/ SECURITY | ENERGY SAVING | REMOTE CONTROL |
| REPORT | RECIPES | SETTINGS |

ELECTRONIC DEVICE, SMART HOME SYSTEM USING ELECTRONIC DEVICE, AND METHOD FOR CONTROLLING SMART HOME SYSTEM

CROSS REFERENCE TO RELATED APPLICATIONS

This application is the National Phase of PCT International Application No. PCT/KR2015/009159, filed on Aug. 31, 2015, which claims priority under 35 U.S.C. 119(a) to Patent Application Nos. 10-2015-0089916, filed in Republic of Korea on Jun. 24, 2015, and 10-2015-0089943, filed in Republic of Korea on Jun. 24, 2015, all of which are hereby expressly incorporated by reference into the present application.

TECHNICAL FIELD

The present invention relates to a smart home system and an electronic device for establishing the same.

BACKGROUND ART

Electronic devices may be generally classified as mobile electronic devices (or mobile/portable terminals) and stationary electronic devices (or stationary terminals) according to their mobility. The mobile electronic devices may also be classified as handheld terminals or vehicle mounted terminals according to whether or not a user can directly carry the terminal.

Electronic devices have become increasingly more functional. Examples of such functions include capturing images and video, playing music or video files, playing games, receiving broadcastings, etc. Some electronic devices are configured as multimedia players. Various attempts have been made to implement complicated functions in such an electronic device by means of hardware or software.

Recently, the development of communication technology has enabled connecting electronic devices or terminals included in a space of a certain size, like a home or office, with a network. For example, if electronic devices are connected via a network in a home, this can be referred to as a home network. With such a home network established in a home, it is possible to control electronic devices connected to the home network via a central server.

DISCLOSURE OF THE INVENTION

Therefore, an object of the present invention is to provide an electronic device capable of sensing information on a home appliance or particular place, in order to establish a smart home system.

Furthermore, another object of the present invention is to provide an electronic device capable of sensing information on a home appliance or particular place that can be easily used for different purposes depending on which home appliance the user wants to use.

Furthermore, yet another object of the present invention is to provide a smart home system that can manage information sensed by electronic devices attached at different locations in an integrated way.

To achieve these and other advantages and in accordance with the purpose of the present invention, as embodied and broadly described herein, there is provided an electronic device according to one embodiment of the present invention, comprising: a body portion with an electric circuit; a wireless communication part provided in the body portion; a sensor part mounted to the body portion and sensing at least one sensing target; a cover portion detachably connected to the body portion so as to cover at least part of the body portion and electrically connected to the electric circuit; and a controller that controls the wireless communication part so as to transmit to an external device a wireless signal corresponding to the value of a resistance formed by the attachment of the cover portion and sensing information sensed by the sensor part.

In this embodiment, the sensor part comprises at least one among a proximity sensor, a vibration sensor, a gyro sensor, an acceleration sensor, a temperature sensor, a humidity sensor, and a touch sensor, and the operation of each of the sensors included in the sensor part is determined by the above resistance value.

In this embodiment, a particular home appliance matches the value of resistance formed by the attachment of the body portion and the cover portion, and at least one sensor to be operated among the sensors included in the sensor part is determined according to the type of the particular home appliance that matches the value of resistance formed by the attachment of the cover portion and the body portion.

In this embodiment, the electronic device further comprises an output part that outputs at least one between visual information and auditory information, wherein, if there is event information received from the external device, the controller controls the output part to output the event information, in response to the sensor part's sensing of the user's location the near the body portion.

In this embodiment, the body portion comprises a first magnetic force member, and the cover portion comprises a second magnetic force member that attaches to the body portion as a magnetic force is applied to the first magnetic force member.

In this embodiment, the electronic device further comprises a first grounded part provided in the body portion and electrically connected to the cover portion, wherein the cover portion further comprises a resistor part having a specified resistance value and a second grounded part electrically connected to the body portion.

In this embodiment, when the body portion and the cover portion are attached to each other by the first and second magnetic force members, the body portion and the cover portion are electrically connected through the first and second grounded parts, and the specified resistance value of the resistor part is transmitted to the controller, based on the electrical connections of the first and second grounded parts.

There is provide an electronic device according to another embodiment of the present invention, comprising: a body portion; a wireless communication part provided in the body portion; a user input part formed in the body portion and receiving an input specifying an operation mode; sensor part provided in the body portion and sensing at least one sensing target associated with the specified operation mode; and controller that controls the wireless communication part so as to transmit to an external device a wireless signal corresponding to the input specifying an operation mode and sensing information sensed by the sensor part.

In this embodiment, the body portion comprises a variable resistor part that varies in resistance, and different operation modes match different resistance values of the variable resistor part.

In this embodiment, the resistance of the variable resistor is varied by an input received through the user input part.

In this embodiment, the electronic device further comprises a display part provided in the body portion and configured to output visual information, wherein the display part outputs information about an operation mode that matches a specific resistance value, based on an input received through the user input part.

There is provide an electronic device according to another embodiment of the present invention, comprising: a body portion; a wireless communication part provided in the body portion; a cover portion detachably connected to the body portion so as to cover at least part of the body portion; a sensor part provided in the body portion and sensing at least one sensing target; and a controller that controls the wireless communication part so as to transmit at least one between a first signal and a second signal to an external device, wherein the first signal is a signal corresponding to sensing information sensed by the sensor part, and the second signal is a signal generated by the attachment of the cover portion.

In this embodiment, a magnet is mounted to one part of the cover portion, and the sensor part comprises a Hall sensor configured to sense the magnetic field of the magnet, wherein the second signal is generated based on sensing the magnet field of the magnet mounted to the cover portion.

In this embodiment, the body portion has a plurality of Hall sensors, and the controller determines the position of the magnet mounted to the cover portion by using the Hall sensors.

In this embodiment, the controller runs different operation modes depending on the position of the magnet mounted to the cover portion.

There is provided a terminal according to another embodiment of the present invention, comprising: a wireless communication part configured to receive from an external device resistance information corresponding to the value of resistance formed by attachment of a cover portion to the external device; and a controller configured to specify the purpose of the external device based on the received resistance information and to generate status information corresponding to the specified purpose of the external device by using sensing information received from the external device that is sensed by a sensor provided in the external device.

In this embodiment, if the received resistance information corresponds to a first resistance value, the controller specifies the purpose of the electronic device as a first purpose, and if the received resistance information corresponds to a second resistance value different from the first resistance value, the controller specifies the purpose of the electronic device as a second purpose different from the first purpose.

In this embodiment, the terminal further comprises a memory part configured to store matching information on different purposes corresponding to different resistance values, wherein the controller specifies the purpose of the external device, corresponding to a resistance value matching the received resistance information.

In this embodiment, the terminal comprises an output part that outputs at least one between visual information and auditory information, wherein the controller controls the output part so as to output the generated status information in at least one between visual and auditory ways.

In this embodiment, the terminal further comprises a sensing part configured to sense the user's movement, wherein, upon sensing that the user is near the main body of the terminal after the status information is generated, the controller controls the output part to output the status information.

In this embodiment, the controller transmits the generated status information to a preset external device so that the generated status information is output on the preset mobile terminal.

There is provided a method for controlling a smart home system comprising: a first electronic device; and a second electronic device according to another embodiment of the present invention, the method comprising: generating a specific signal based on a cover portion attached to cover at least part of the first electronic device; transmitting, by the first electronic device, the specific signal to the second electronic device; specifying, by the second electronic device, the type of an external device associated with the first electronic device by using the specific signal; transmitting, by the first electronic device, a sensing value obtained from at least one sensing target to the second electronic device; and processing, by the second electronic device, the sensing value obtained from the at least one sensing value so that the sensing value is associated with the specific external device.

In this embodiment, in the processing of the sensing value, status information corresponding to the type of the specified external device is generated based on the sensing value, and the generated status information is transmitted to a third electronic device different from the first and second electronic devices.

In this embodiment, the third electronic device transmits to the second electronic device the settings for a sensor provided in the first electronic device that are determined based on the user's selection, the second electronic device controls the sensor provided in the first electronic device based on the settings for the sensor provided in the first electronic, and the first electronic device is run based on the settings determined by the third device.

In this embodiment, the first electronic device comprises at least one among a proximity sensor, a vibration sensor, a gyro sensor, an acceleration sensor, a temperature sensor, a humidity sensor, and a touch sensor, and the operation of each of the sensors is determined by the above settings.

In this embodiment, the first electronic device further comprises a voice input part, and, upon receiving the user's voice through the voice input part, transmits voice information corresponding to the received voice to the second electronic device or to at least one preset mobile terminal.

In this embodiment, the purpose of the first electronic device is determined by the value of resistance formed in a cover portion attached to cover at least part of the first electronic device.

An electronic device and a smart home system using the same according to the present invention can specify the purpose according to the resistance of the electronic device. Further, the resistance of the electronic device can be easily changed by user manipulation, so that the user can configure the settings for the electronic device to serve a desired purpose when they first use the electronic device or change the purpose of the electronic device during use.

According to the present invention, since the purpose of the electronic device can be changed only by changing the resistance, there is no need to install an individual electronic device on each home appliance or each particular space the user wants to monitor through the smart home system.

Furthermore, according to the present invention, information on a home appliance or particular place not equipped with a function to communicate with the smart home system can be monitored by sensing information on the home appliance or particular place by a sensor in the electronic device. Therefore, there is no need to equip the user's home with a home appliance dedicated to communicating with the central server of the smart home system in order to establish a smart home system.

BRIEF DESCRIPTION OF THE DRAWINGS

FIGS. 10A and 10B are conceptual diagrams illustrating different uses of an electronic device according to the present invention;

FIGS. 11A, 11B, 11C, and 11D are conceptual diagrams illustrating a method of configuring the settings for an electronic device according to the present invention;

FIGS. 13A, 13B, and 14 are conceptual diagrams illustrating an example of application of a smart home system according to the present invention.

MODES FOR CARRYING OUT THE PREFERRED EMBODIMENTS

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
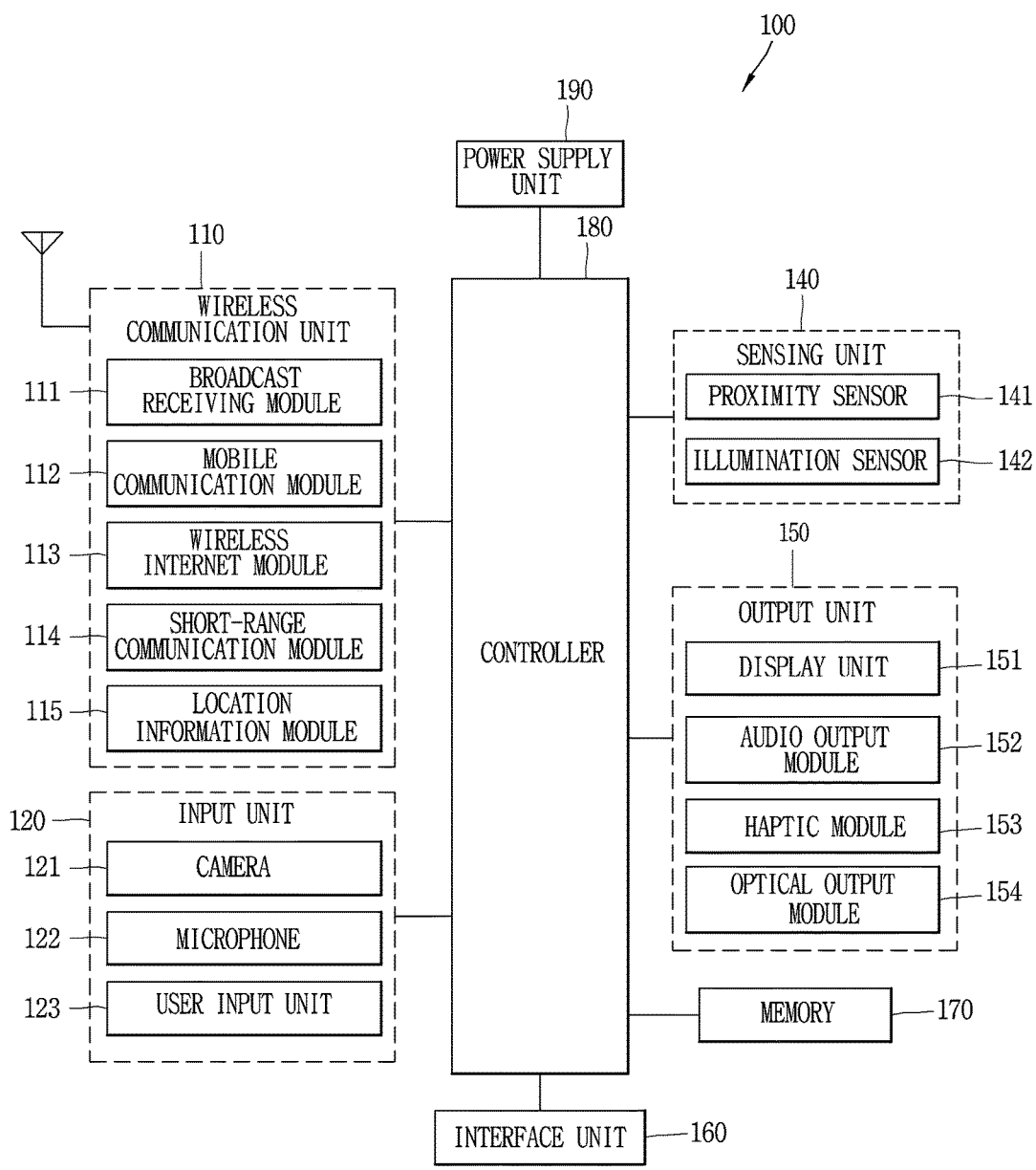
FIG. 1A is a block diagram illustrating a mobile terminal related to the present invention.
Figure 1B:
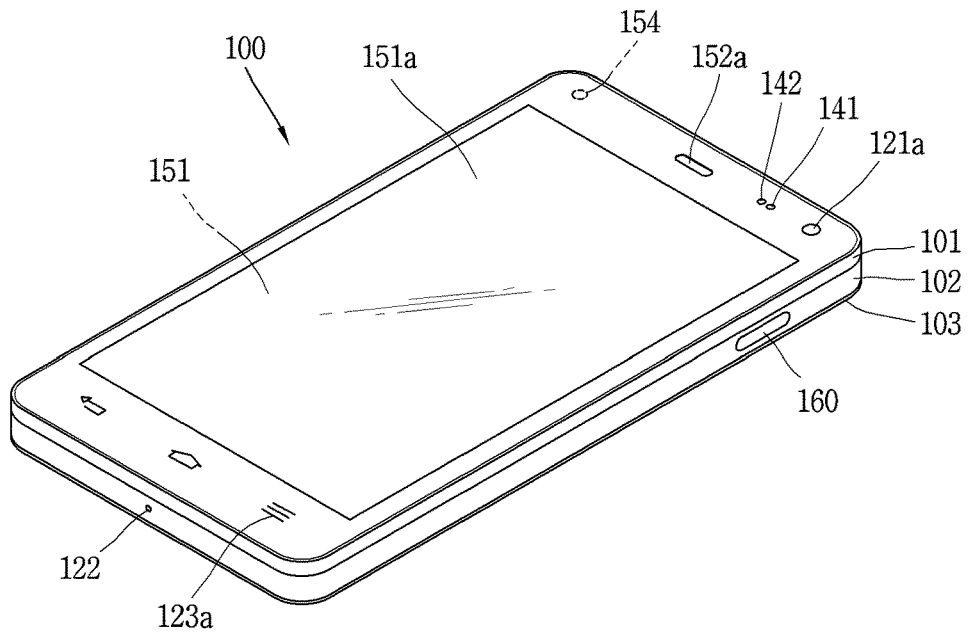
FIGS. 1B and 1C are conceptual diagrams of an example of a mobile terminal related to the present invention when viewed from different directions.
Figure 1C:
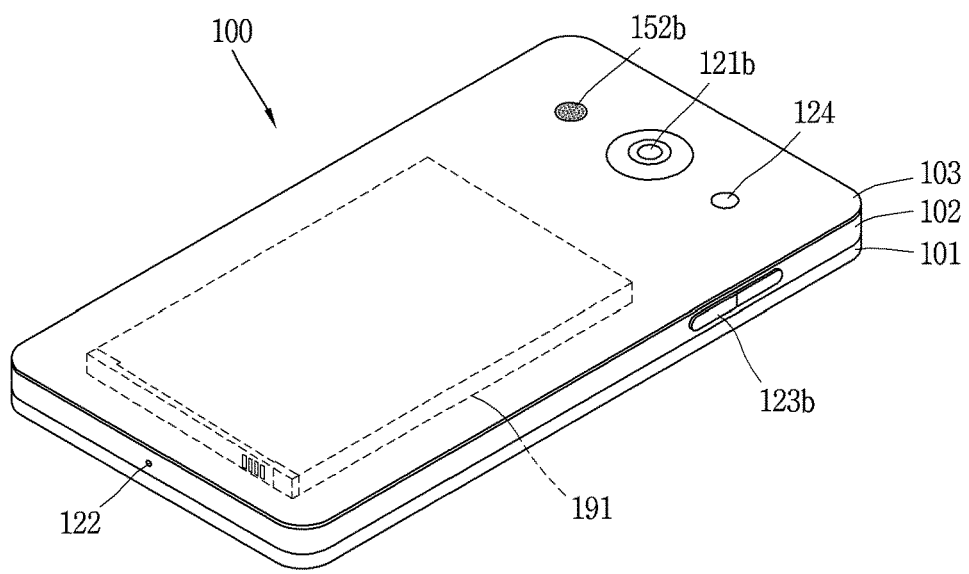

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

The mobile terminal 100 is shown having wireless communication unit 110 configured with several commonly implemented components. The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components, or activating application programs stored in the memory 170.

The controller 180 controls some or all of the components illustrated in FIG. 1A in order to drive an application program stored in the memory 170. Further, the controller 180 may operate at least two of the components of the mobile terminal 100 in order to drive the application program.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least some of the above components may operate in a cooperating manner, so as to implement an operation or a control method for a mobile terminal according to various embodiments to be explained later. The operation or the control method for the mobile terminal may be implemented on the mobile terminal by driving at least one application program stored in the memory 170.

Before explaining various embodiments of the mobile terminal 100, the aforementioned components will be explained in more detail with reference to FIG. 1A.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller. 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The terminal body may be understood as at least one assembly of the mobile terminal 100.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal may be provided with a display unit 151, first and second audio output modules 152a, 152b, a proximity sensor 141, an illumination sensor 142, an optical output module 154, first and second cameras 121a, 121b, first and second manipulation units 123a, 123b, a microphone 122, an interface 160, etc.

Hereinafter, as shown in FIGS. 1B and 1C, will be explained the mobile terminal 100 having the display unit 151, the first audio output module 152a, the proximity sensor 141, the illumination sensor 142, the optical output module 154, the first camera 121a and the first manipulation unit 123a on the front surface of the terminal body, having the second manipulation unit 123b, the microphone 122 and the interface unit 160 on the side surfaces of the terminal body, and having the second audio output module 152b and the second camera 121b on the rear surface of the terminal body.

However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. For example, the display unit 151 may display execution screen information of an application program executing at the mobile terminal 100 or user interface (UI) and graphic user interface (GUI) information in response to the execution screen information.

The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

A flash 124 is shown adjacent to the second camera 121b. When an image of a subject is captured with the camera 121b, the flash 124 may illuminate the subject.

As shown, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 (refer to FIG. 1A) may be retractable into the terminal body. Alternatively, an antenna may be formed using a film attached to an inner surface of the rear cover 103, or a case that includes a conductive material.

A power supply unit 190 (refer to FIG. 1A) for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Figure 2:
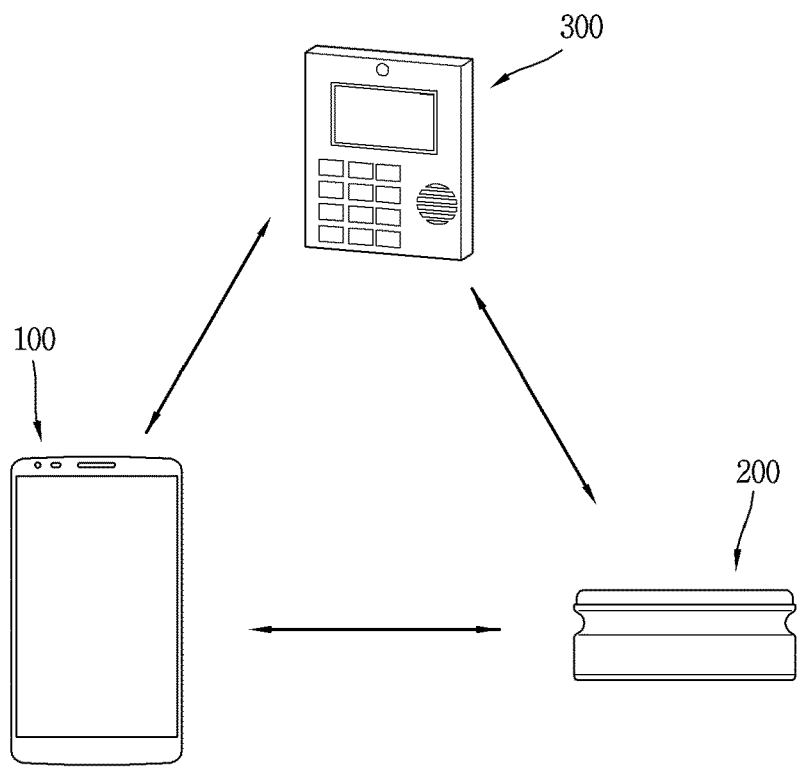
FIG. 2 is a block diagram illustrating a smart home system related to the present invention.

Meanwhile, as shown in FIG. 2, a smart home system according to the present invention may include the above-described mobile terminal 100, central server 300, and electronic device 200 that senses a home appliance or particular location. In the present invention, the central server 300 may be replaced with the mobile terminal 100. That is, in this case, the smart home system may include the mobile terminal 100 and the electronic device 200.

The central server 300 generates status information on a sensing target (e.g., a home appliance with the electronic device 200 attached to it or a person in a place where the electronic device 200 is located) to be sensed by the electronic device 200, based on information sensed by the electronic device 200.

The status information thus generated may be output through an output part provided in the central server 300 in at least one among visual, auditory, and tactile ways. Also, the status information generated by the central server 300 may be transmitted to the mobile terminal 100. Thus, the user may check information on the sensing target to be sensed by the electronic device 200, through the mobile terminal 100. Meanwhile, it will be obvious to those skilled in the art that the smart home system according to the present invention may be configured without the mobile terminal 100.

In such a smart home system, the mobile terminal 100 is able to perform communication with the central server 300 and the electronic device 200 individually. That is, the mobile terminal 100 may transmit information directly to the electronic device 200 and receive information directly from the electronic device 200.

Meanwhile, an application associated with the smart home system may be installed on the mobile terminal 100 according to the present invention. Through this application, the mobile terminal 100 may use information received from the central server 300 or electronic device 200.

Meanwhile, the electronic device according to the present invention may be placed on a home appliance or in a particular place because it is attachable and detachable. Such an electronic device senses information on a home appliance or particular place with the electronic device attached to it, through a sensor in the electronic device, and transmits the sensed information to the mobile terminal 100 or central server 300. For example, according to the present invention, even if the home appliance has no communication function, information on the home appliance may be sensed through the electronic device 200 and transmitted to the mobile terminal 100 or central server 300, thereby establishing a smart home system.

Meanwhile, the purpose of the electronic device according to the present invention may be specified according to the resistance of a resistor provided in a cover attached the electronic device or the resistance of a resistor provided in the main body of the electronic device. Here, the purpose of the electronic device may correspond to the purpose of a sensing target to be sensed by the electronic device. For instance, if attached to a washing machine, the purpose of the electronic device may be to sense information related to the washing machine. Also, if attached to an air conditioner, the purpose of the electronic device may be to sense information related to the air conditioner. Meanwhile, the purpose may match each resistance value. Thus, in the present invention, the purpose of the electronic device may be specified according to the resistance of a resistor provided in the cover of the electronic device. That is, the electronic device may transmit a sensed resistance value to the central server 300, and the central server 300 may specify the purpose of the electronic device.

Meanwhile, as discussed above, the electronic device may have a resistor not in the cover but in the main body, and the main body of the electronic device may have a variable resistor. Thus, the resistance may be varied by the variable resistor, in which case the purpose of the electronic device also may be changed. Meanwhile, the purpose of the electronic device may be specified in many modified ways.

Hereinafter, the structure and functions of such an electronic device will be described more specifically in conjunction with the attached drawings.

Figure 3A:
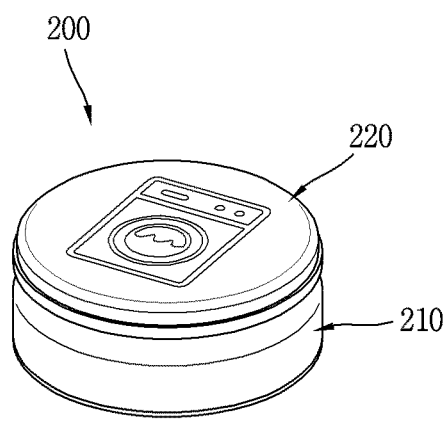
FIGS. 3A and 3B are a perspective view and exploded view illustrating the structure of an electronic device that senses a home appliance and a particular place.
Figure 3B:
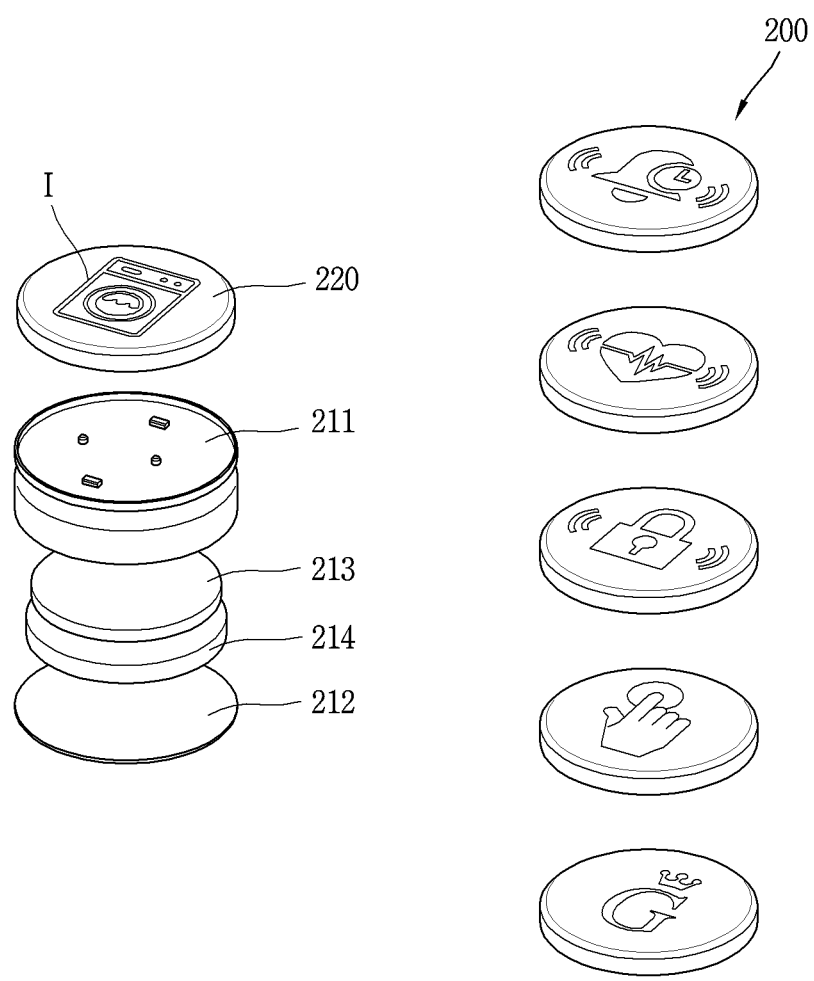
Figure 4A:
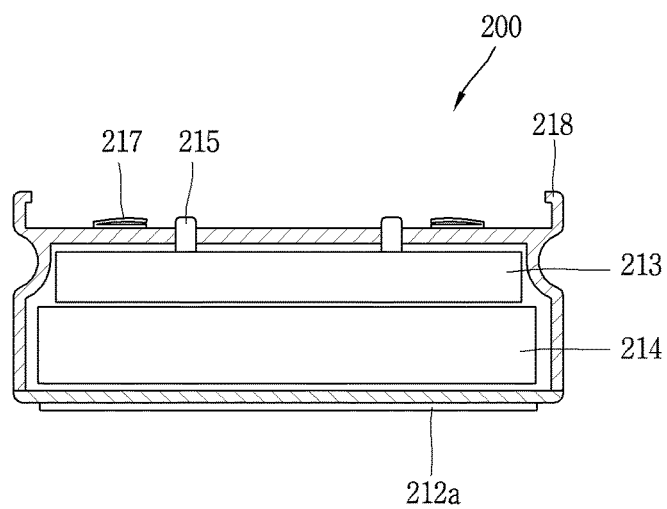
FIG. 4A is a cross-sectional view of a body portion of the electronic device of FIG. 3A.
Figure 4B:
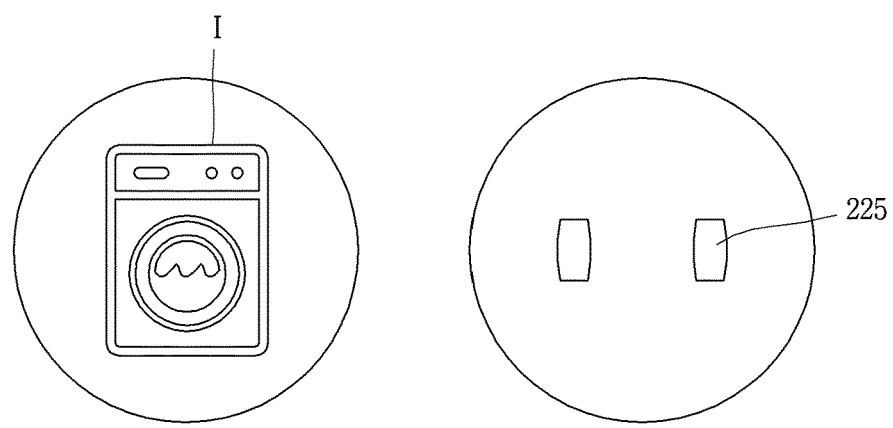
FIG. 4B is conceptual diagrams of a cover portion of the electronic device of FIG. 3A.
Figure 4B:
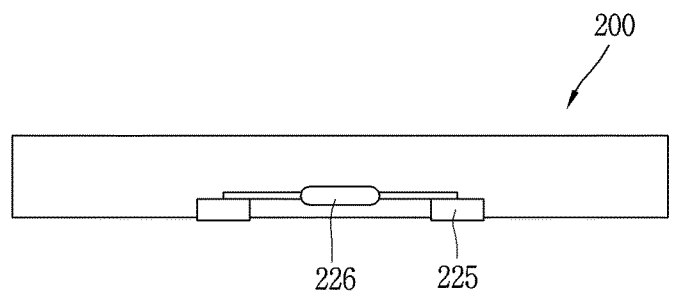

FIGS. 3A and 3B are a perspective view and exploded view illustrating the structure of an electronic device that senses a home appliance and a particular place. FIG. 4A is a cross-sectional view of a body portion of the electronic device of FIG. 3A, and FIG. 4B is conceptual diagrams of a cover portion of the electronic device of FIG. 3A.

As shown in FIGS. 3A and 3B, the electronic device 200 may be configured in such a way that a cover portion 220 is attached to one body portion 210. However, the present invention is not limited to this, and the body portion 210 may be replaced by a plurality of body portions that are secured and attached to one another or by a plurality of body portions that are attached movably relative to one another.

As depicted in the figures, the body portion 210 and the cover portion 220 are positioned to overlap. As for parts that can be placed in the body portion 210 and the cover portion 220 and functions implemented by them, various examples may be derived depending on the feature the electronic device 200 is focused on, or depending on the preferred user interface.

In an example, the cover portion 220 mainly serves as a user input part for selecting an electronic device's function, and the body portion 210 is configured to perform the selected function. Also, the cover portion 220 may perform a function of outputting information related to the selected function on the screen.

The cover portion 220 may be mounted on the body portion 210 and formed in the shape of a coin.

More specifically, the cover portion 220 may be made of a thin, circular plate, and may be positioned to cover the front of the body portion 210. Also, the cover portion 220 may have an icon (I) printed on one side.

The cover portion 220 may have an output part that outputs at least one between visual information and auditory information. In this case, if there is event information received from the external device, the controller controls the output part to output the event information, in response to the sensor part's sensing of the user's location near the body portion. As an example of the output part, a display part that outputs visual information may be placed on one side of the cover portion 220. In this case, the display part may be configured to be controlled by the controller of the body portion and to be supplied with electric power from a power supply part of the body portion.

With reference to these drawings, the cover portion 220 is detachably connected to the body portion 210. That is, the cover portion 220 is removably fastened to the body portion 210 so that the user can chose to change the cover portion 220, and a plurality of cover portions are configured interchangeably. In this case, if the cover portion 220 is attached to the body portion 210, the cover portion 220 may be electrically connected to the body portion 210.

The body portion 210 includes a case (casing, housing, etc.) forming the exterior appearance.

In this embodiment, the case may be divided into a front case 211 and a rear case 212. At least one intermediate case may be additionally placed between the front case 211 and the rear case 212. Various electronic parts are embedded in a built-in space formed between the front case 211 and the rear case 212.

The built-in space may incorporate a wireless communication part that enables wireless communication between the electronic device 200 and a wireless communication system or between the electronic device 200 and a network where the electronic device 200 is located. For example, the wireless communication part may include a mobile communication module, a wireless internet module, a short-range communication module, a location information module, etc. Also, an antenna for wireless data communication may be placed within the electronic device 200. Wireless signals sent and received with the antenna may be used for wireless data communication with other electronic devices.

Moreover, a sensor part for sensing at least one among information on the inside of the electronic device, information about the surroundings of the electronic device, and user information may be placed in the built-in space. For example, the sensor part may include at least one among a proximity sensor, a vibration sensor, a gyro sensor, an acceleration sensor, a temperature sensor, a humidity sensor, and a touch sensor. The electronic device disclosed in this specification may use information sensed by at least two of these sensors in combination.

According to the illustration, a circuit board 213 is mounted in the built-in space. The circuit board 213 may be connected to a module for enabling wireless communication, for example, to process the wireless signals, and may be connected to the above sensors so as to control them. In this case, the circuit board 213 is configured as an example of a controller for running various functions of the electronic device, and may have an electric circuit for running these various functions. Sensing information sensed by the sensor part may be sent to an external device through the wireless communication part, and the electric circuit performs this function.

In addition, since the body portion 210 is electrically connected to the cover portion 220, the controller may be electrically connected to the cover portion 220 and sense various information from the cover portion 220 and perform various controls using this information.

Furthermore, a power supply part 214 may be mounted in the built-in space. The power supply part 214 may be embedded inside the body portion 210 as a built-in battery to power the electronic device 200.

Meanwhile, referring to FIGS. 4A and 4B together with FIG. 3B, a first grounded part 215 electrically connected to the cover portion 220 is formed in the body portion 210, and a second grounded part 225 electrically connected to the body portion (e.g., first grounded part) is formed in the cover portion 220. More specifically, the first grounded part 215 may be placed on one side of the front case 211, and the second grounded part 225 may be placed on the bottom side of the cover portion 220 facing the one side. Also, the first and second grounded parts 215 and 225 may be placed to face each other, with the cover portion 220 mounted on the body portion 210.

The first grounded part 215 is positioned at the center of one side of the front case and electrically connected to the circuit board 213. The cover portion 220 may have a resistor part 226 connected to the second grounded part 225. The resistor part 226 is configured to have a specified resistance value. The specified resistance value of the resistor part 226 is transmitted to the controller, based on the electrical connections of the first and second grounded parts 215 and 225.

The controller may generate a wireless signal corresponding to the value of resistance formed by the attachment of the cover portion 220 and transmit it to an external device through the wireless communication part. In this case, the operation of each of the sensors included in the sensor part may be determined by the above resistance value. A plurality of cover portions, which the user may selectively replace by one another, may have different resistance values. Thus, the operation of each of the sensors may be determined by the type of the cover portion 220 mounted on the body portion 210.

Meanwhile, the cover portion 220 may be attached to the body portion 210 by push & pull. To this end, an elastic member 217 may be placed on one side of the front case, and a protrusion 218 may be formed on the edge of the front case so that the cover portion 220 is held in the direction it is removed. For example, a plate spring may be mounted on the one side to support the cover portion 220, and the cover portion 220 may fit into the edge of the front case, thus allowing the cover portion 220 to attach to the body portion 210.

In this case, the attachment of the cover portion 220 and the body portion 210 may be done by magnetic force members (not shown). For example, the body portion 210 may have a first magnetic force member, and the cover portion 220 may have a second magnetic force member that attaches to the body portion 210 as a magnetic force is applied to the first magnetic force member. When the body portion 210 and the cover portion 220 are attached to each other by the first and second magnetic force members, the body portion 210 and the cover portion 220 are electrically connected through the first and second grounded parts 215 and 225. Meanwhile, the electronic device may be attachable to a specific position. For example, an adhesive part 212a may be formed on one side (outer side) of the rear case 212, and the electronic device may be attached to a particular home appliance through the adhesive part 212a.

With this structure, the controller recognizes a resistance value by the attachment of the body portion 210 and the cover portion 220, and a particular home appliance may match this resistance value. In this case, at least one sensor to be operated among the sensors included in the sensor part may be determined according to the type of the particular home appliance that matches the value of resistance formed by the attachment of the cover portion 220 and the body portion 210.

Meanwhile, although not shown, a particular home appliance where the electronic device according to the present invention is placed may have a receiving portion for receiving the electronic device 200. Such a receiving portion provided in the particular home appliance may be fastened in such a way that it attaches to the electronic device 200.

Meanwhile, the operating state of the electronic device 200, when attached to the receiving portion of the particular home appliance, may be switched from off state to on state. The electronic device 200 may start sensing the particular home appliance, as it is attached to the receiving portion of the particular home appliance.

Meanwhile, the particular home appliance may further include a wireless communication part and a controller, and this wireless communication part may be configured to communicate with the above-described central server 300. Furthermore, the particular home appliance may further include a circuit portion, and this circuit portion serves to sense the resistance value of the electronic device 200 attached to the receiving portion and transmit the sensed resistance value to the central server 300 through the wireless communication part.

As such, in a case where the particular home appliance is a smart home appliance including a wireless communication part, a controller, a circuit part, etc., the home appliance 200 may serve as a sensing means and not communicate with the central server 300. That is, in this case, information sensed by the sensor in the electronic device 200 may be transmitted to the particular home appliance and then to the central server 300 through the particular home appliance.

Meanwhile, the electronic device 200 may be configured to receive power from the particular home appliance, as it is attached to the particular home appliance. That is, the receiving portion of the particular home appliance may have an electric connector terminal which allows for an electrical connection with the electronic device 200, and with this configuration, the electronic device 200 may receive power from the particular home appliance. In this case, the home appliance 200 may not have its own battery for supplying power.

As stated above, the electronic device 200 according to the present invention may be attached to a particular home appliance including a receiving portion configured to attach to the electronic device 200, and sense information related to the particular home appliance.

Meanwhile, the above-described structure of the electronic device may be modified in many ways. Hereinafter, such a modified example will be described in more details with reference to FIGS. 5A to 8. Also, in a modified example or embodiment to be described below, the same or similar elements to those in the foregoing example are denoted by the same or similar reference numerals, and their descriptions will be replaced with the previous description.

FIGS. 5A, 5B, 6A, 6B, 7A, 7B, and 8 are conceptual diagrams illustrating a modified structure of the above-mentioned electronic device.

Figure 5A:
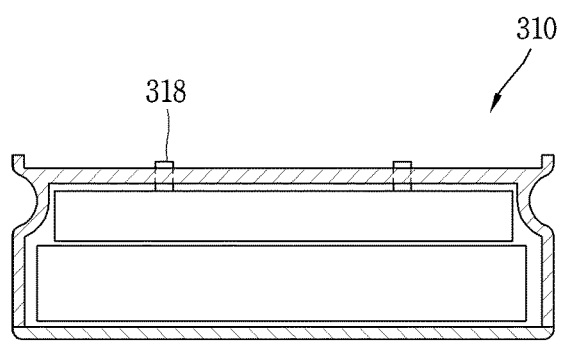
FIGS. 5A, 5B, 6A, 6B, 7A, 7B, and 8 are conceptual diagrams illustrating a modified structure of the above-mentioned electronic device.
Figure 5B:
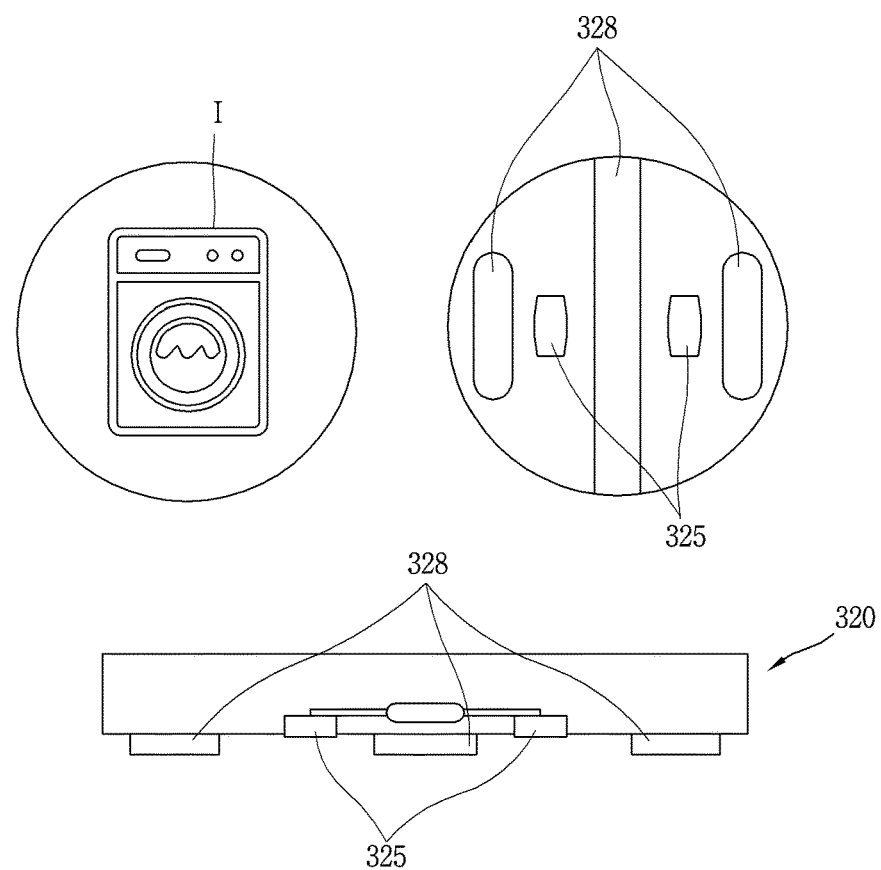

Referring to FIGS. 5A and 5B, the cover portion 320 may be attached to the body portion 310 by rail insertion, rather than by push & pull but. In this case, the body portion 310 detects the value of the resistance in the cover portion 320 by using the connections of the first and second grounded parts 315 and 325, as described in the above embodiment. Therefore, the controller is able to recognize the type of the cover portion 320.

To this end, a first rail portion 318 may be formed on one side of the front case of the body portion 310. In this case, the first grounded part 315 may be placed on a protruding surface of the first rail portion 318. A second rail portion 328 to be slidably attached to the first sliding portion 318 may be formed on the bottom side of the cover portion 320 that faces one side of the first rail portion 318. The second grounded part 325 may be placed on a recessed surface of the second rail portion 328 and electrically connected to the first grounded part 315 placed on the first rail portion 318.

Figure 6A:
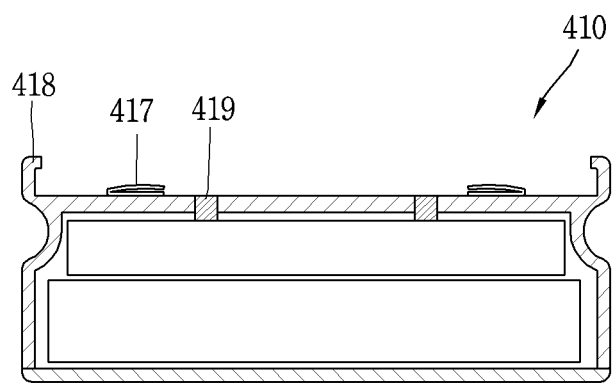
Figure 6B:
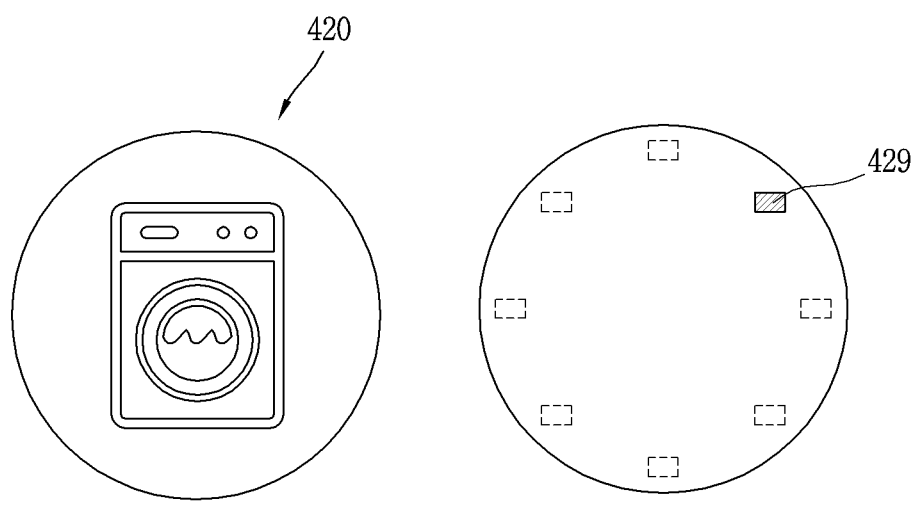

Referring to FIGS. 6A and 6B, the type of the cover portion 420 may be recognized by Hall measurement, rather than by resistance measurement. In this case, the cover portion 420 and the body portion 410 may be attached by either the above-mentioned push & pull method or the rail insertion method. In this embodiment, the push & pull method is used. Accordingly, an elastic member 417 may be mounted on the front case, and a protrusion 418 may be formed on the edge of the front case.

According to the illustration, a magnet 429 is mounted to the cover portion 420, and the sensor part includes a Hall sensor 419 configured to sense the magnetic field of the magnet 429.

As depicted in the drawings, the body portion 410 may have a plurality of Hall sensors, and the controller may determine the position of the magnet 429 mounted to the cover portion 420 by using the Hall sensors.

For example, two Hall sensors 419 may be mounted on the circuit board 413, and the magnet 429 may be placed at any one of positions spaced at specific intervals along the outer circumference of the cover portion 420. For a plurality of cover portions, the magnet 429 is mounted at different positions, by which the relative positions of the magnets of the cover portions and the Hall sensors vary with the type of the cover portion.

In this case, the controller runs different operation modes depending on the position of the magnet mounted to the cover portion. For example, the controller may transmit to an external device sensing information on at least one sensing target as a first signal. Also, the controller controls the wireless communication part, and transmits a second signal generated by the attachment of the cover portion to the external device. The second signal is generated based on sensing the magnet field of the magnet mounted to the cover portion by the Hall sensor, which may vary with the type of the cover portion.

In order to recognize the type of the cover portion and transmit the second signal, the Hall sensor 419 detects the position of the magnet 429 through the cover portion 420 mounted to the body portion 410. That is, the identity of the cover portion 420 is represented by which of the positions spaced at specific intervals the magnet is placed in.

Figure 7A:
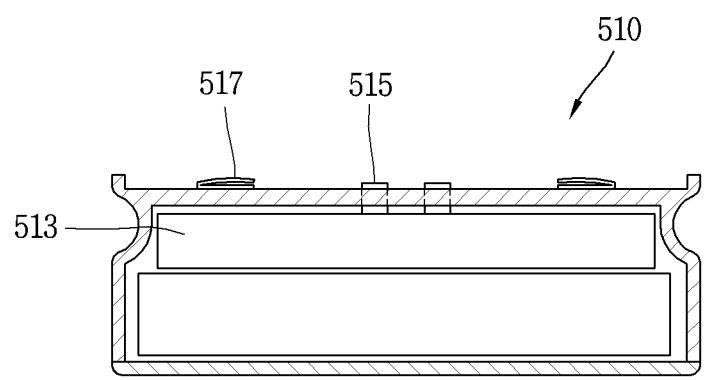
Figure 7B:
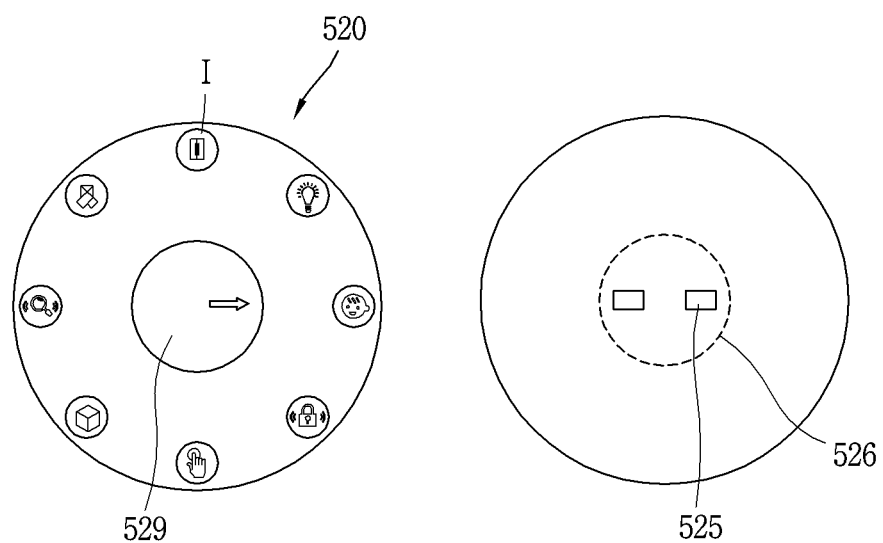

Referring to FIGS. 7A and 7B, the cover portion 520 mounted to the body portion may be a single cover portion, rather than one selected from a plurality of cover portions.

More specifically, the cover portion 520 may have different values of resistance, by which, despite the single cover portion, a certain resistance value may match the type of a particular home appliance.

The cover portion 520 may be attached to the body portion 510 by push & pull. To this end, an elastic member 517 may be placed on one side of the front case, and a protrusion 518 may be formed on the edge of the front case so that the cover portion 520 is held in the direction it is removed.

Moreover, a first grounded part 515 electrically connected to the cover portion 520 is formed in the body portion 510, and a second grounded part 525 electrically connected to the body portion (e.g., first grounded part) is formed in the cover portion 520. More specifically, the first grounded part 515 may be placed on one side of the front case 511, and the second grounded part 525 may be placed on the bottom side of the cover portion 520 facing the one side. Also, the first and second grounded parts 515 and 525 may be placed to face each other, with the cover portion 520 mounted on the body portion 510.

The first grounded part 515 is positioned at the center of one side of the front case and electrically connected to the circuit board 513 of the body portion. The cover portion 520 may have a variable resistor part 526 connected to the second grounded part 525, and the variable resistor part 526 is configured to vary in resistance.

Different operation modes may match different resistance values of the variable resistor part.

More specifically, the resistor part 526 is a button-like variable resistor, whose resistance varies as the body rotates. For example, the resistor part 526 is configured to have a matching resistance value as it rotates from a reference point to one of the positions spaced at specific intervals along the outer circumference of the cover portion 520.

The resistance of the variable resistor part is varied by an input received through the user input part 529. The user input part 529 is formed in the body portion, and receives an input that specifies an operation mode. More specifically, for rotating the resistor part 526, the user input part 529 may have a dial that is rotatably mounted to the body of the cover portion 520, and the dial may be connected to the resistor part 526. As such, it is possible to determine the type of a particular home appliance matching a resistance value by attaching a variable resistor to the middle of the cover portion 520 and turning the dial-type user input part 529.

Meanwhile, in this example, the cover portion is configured to externally show the current operating state of the electronic device. To this end, the body portion has a display part that outputs visual information, and the display part may output information about an operation mode that matches a specific resistance value, based on an input received through the user input part.

In another example, such a representation may be provided by icons I shown on the outer surface of the cover portion 520. These icons each may correspond to the type of a particular home appliance matching a resistance value.

Moreover, power may be supplied without the icons displayed, and one of the icons may be displayed on the cover portion 520. To this end, a plurality of light sources (not shown) may be equipped in the cover portion 520, corresponding to each icon. Also, the cover portion 520 may be made thin so that light from the light sources can pass through it, or may be made of an opaque material.

With this structure, when a particular home appliance is selected by rotating the user input unit (input unit) 529, the controller supplies power to the light source that illuminates the icon representing the selected home appliance. By this, the user is informed of which home appliance is selected. The power supply may be discontinued after a specific amount of time.

Figure 8:
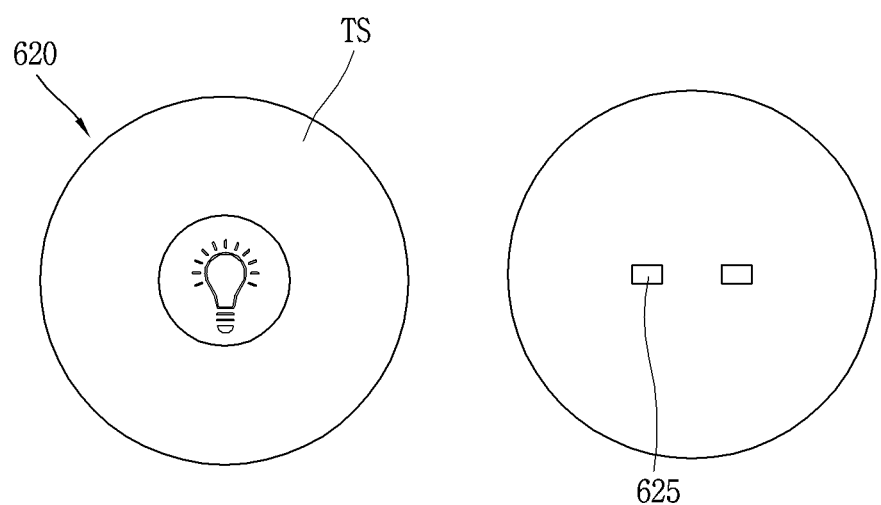

Referring to FIG. 8, the cover portion 620 mounted to the body portion (not shown) is a single cover portion, rather than one selected from a plurality of cover portions, and a touchscreen TS may be placed on the outer surface of the cover portion 620 so as to receive touch input and output visual information.

In this case, icons each corresponding to the type of a particular home appliance matching a resistance value are output on the touchscreen, and these icons may be selected with touch. More specifically, for making a selection, a first grounded part (not shown) electrically connected to the cover portion 620 is formed in the body portion 610, and a second grounded part 625 electrically connected to the body portion (e.g., first grounded part) is formed in the cover portion 620. More specifically, the first grounded part 615 may be placed on one side of the front case 611, and the second grounded part 625 may be placed on the bottom side of the cover portion 620 facing the one side. The first grounded part is positioned at the center of one side of the front case and electrically connected to the circuit board of the body portion, and the second grounded part 625 is electrically connected to the touchscreen. With this structure, when the user touches one of the icons, the controller senses this and performs the functions related to the corresponding home appliance.

As described above, the electronic device according to the present invention may be used for the purpose of sensing different home appliances or a particular place, based on the user's selection or the user's manipulation.

Furthermore, as stated above, this electronic device 200 may establish a smart home system, together with at least one between the terminal 100 or the central server 300. Hereinafter, a detailed description will be given of a method of how to make use of information on a sensing target sensed by the electronic device 200 and control the electronic device 200, based on information sensed by the above-described electronic device 200, in conjunction with the attached drawings. Here, the sensing target may refer to a home appliance with the electronic device 200 attached to it or a particular place where the electronic device 200 is located.

Figure 9:
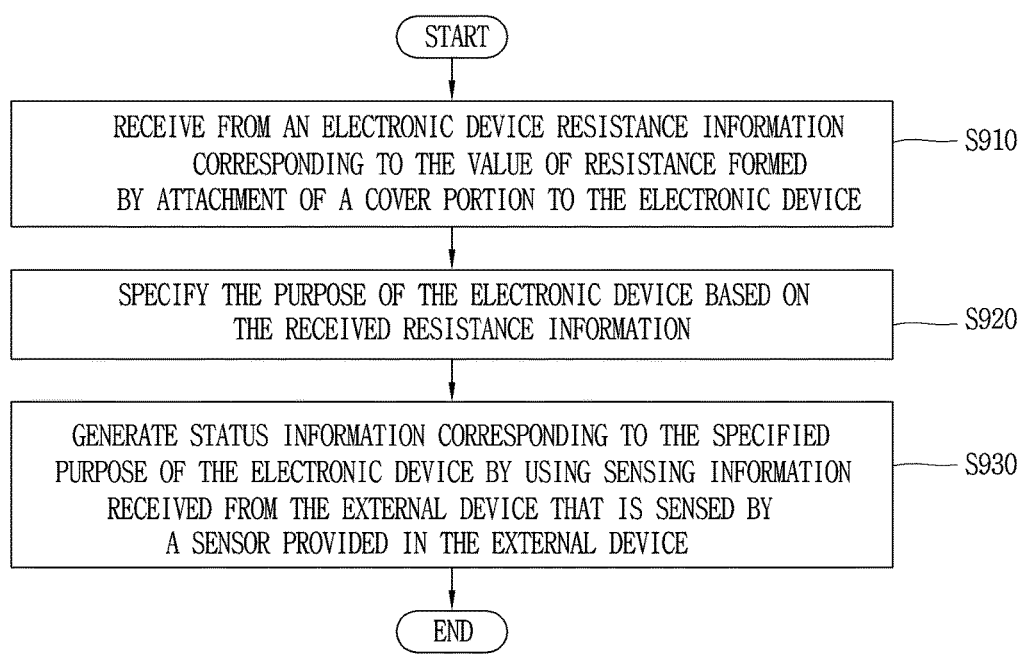
FIG. 9 is a flowchart illustrating an example of operation of an electronic device according to the present invention.
Figure 10A:
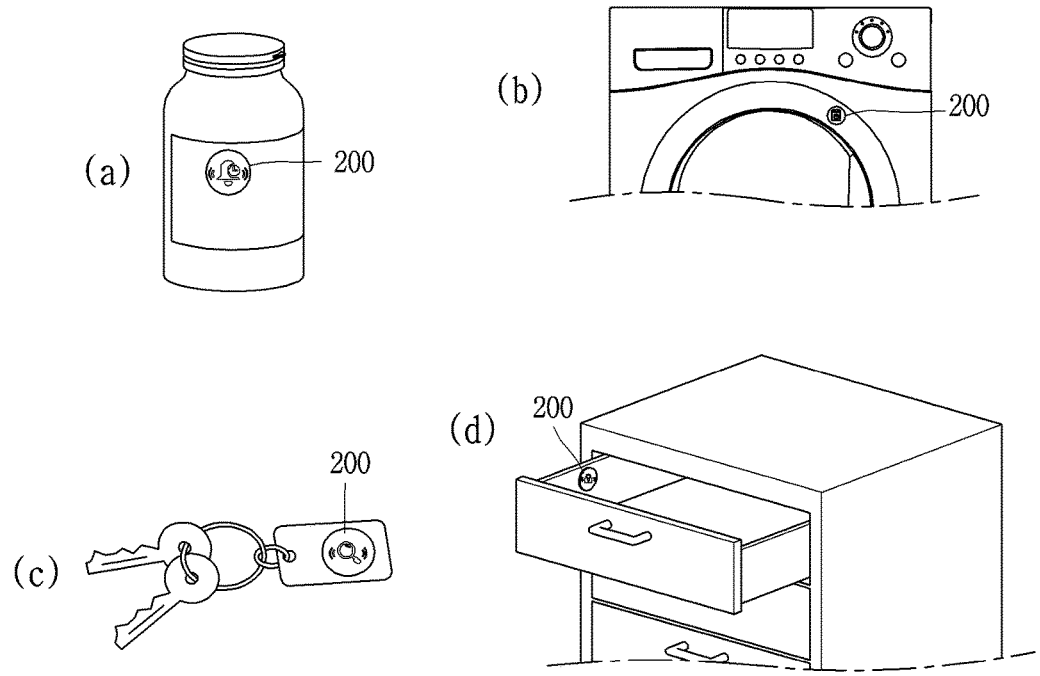

FIG. 9 is a flowchart illustrating an example of operation of an electronic device according to the present invention. FIGS. 10A and 10B are conceptual diagrams illustrating different uses of an electronic device according to the present invention.

Now, the electronic device 200 with a cover attached to it will be described by way of example. Hence, resistance information received from the electronic device 200 will be described to be received as the cover is attached. However, as stated above, it is needless to say that, if the electronic device 200 has a variable resistor, resistance information can be received with no cover attached to it. In this case, the resistance information may be received according to the user's selection. The user's selection may be made through the central server 300, the mobile terminal 100, or the electronic device 200. Meanwhile, the electronic device 200 with the cover attached to it will be described below.

In the smart home system according to the present invention, as the cover portion 220 is attached to the body portion 210, the electronic device 200 senses the value of resistance formed in the cover portion 220 and transmit resistance information based on the sensed resistance value to the central server 300. Here, when the central server 300 is used in place of the mobile terminal 100, the electronic device 200 may transmit the resistance information to the mobile terminal 100. Meanwhile, in this specification, the central server 300 and the mobile terminal 100 are distinguished from each other. However, it is needless to say that the central server 300 also may serve as the mobile terminal 100.

Meanwhile, the central server 300 receives resistance information from the electronic device 200 (S910). Here, the resistance information may be received as the cover portion 220 is attached to the electronic device 200.

The central server 300 specifies the purpose of the electronic device 200 based on the received resistance information (S920). Here, there may exist predetermine information regarding the purpose of the electronic device 200 based on the resistance information. For example, matching information on different purposes corresponding to different resistance values may exist in a memory provided in the central server 300 or an external storage that can be accessed via communication. Accordingly, the controller of the central server 300 may specify the purpose of the electronic device, corresponding to a resistance value matching the received resistance information.

As discussed previously, the purpose of the electronic device 200 may correspond to the purpose of a sensing target to be sensed by the electronic device 200. For instance, if attached to a washing machine, the purpose of the electronic device 200 may be to sense information related to the washing machine. Also, if attached to an air conditioner, the purpose of the electronic device 200 may be to sense information related to the air conditioner. Meanwhile, the purpose may match each resistance value. Thus, in the present invention, the purpose of the electronic device may be specified according to the resistance of a resistor provided in the cover of the electronic device 200. That is, the electronic device 200 may transmit a sensed resistance value to the central server 300, and the central server 300 may specify the purpose of the electronic device 200.

As such, if the received resistance information corresponds to a first resistance value, the controller may specify the purpose of the electronic device as a first purpose, and if the received resistance information corresponds to a second resistance value different from the first resistance value, the controller may specify the purpose of the electronic device as a second purpose different from the first purpose.

Meanwhile, once the purpose of the electronic device 200 is specified, the central server 300 may set up the sensors of the electronic device 200 in such a way that the sensors serving the purpose of the electronic device 200 may be operated among the sensors in the electronic device 200. The controller of the central server 300 may transmit sensor setting information to the electronic device 200, and the electronic device 200 may receive the sensor setting information and change the operation state of its sensors.

A method of specifying the purpose of the electronic device 200 will be described more specifically. As depicted in (a), (b), (c), and (d) of FIG. 10A, the electronic device 200 may be attached to or placed on different sensing targets.

When placing the electronic device 200 on a sensing target, the user may attach a cover with a resistance value matching the purpose of the sensing target to the electronic device 200 or change the resistance of the electronic device 200.

Once the purpose of the electronic device is specified and information sensed by the electronic device 200 is received from the electronic device 200, the controller of the central server 300 may generate status information corresponding to the purpose of the electronic device 200 by using the sensing information received from the electronic device 200 (S930).

The controller may generate different status information according to the purpose of the electronic device even if it receives the same sensing information from the electronic device 200. For instance, if the purpose of the electronic device is to sense information related to the washing machine and the electronic device 200 is attached to the washing machine, the electronic device 200 may sense vibration of the washing machine by its vibration sensor. In this case, the controller of the central server 30 may generate status information saying that "The washing machine is draining" based on this sensing information. On the contrary, if the purpose of the electronic device 200 is to protect privacy and the electronic device 200 is attached to a drawer, the controller may generate status information saying that "The drawer is open", based on the vibration information sensed by the electronic device.

More specifically, an example of generating status information according to the purpose of the electronic device 200 will be described below.

For example, as depicted in (a) of FIG. 10A, the electronic device 200 may be attached to a medicine bottle so that the user can take their medicine on time and remind them when to take the medicine. In this instance, the electronic device 200 may sense the movement, etc. of the medicine bottle and transmit it to the central server 300, and the central server 300 may generate information on when to take the medicine, based on that information. Also, based on the information sent from the central server 300, the electronic device 200 may output reminder information indicating when to take the medicine through at least one among auditory, visual, and tactile information.

In another example, as depicted in (b) of FIG. 10A, the electronic device 200 may be placed on a washing machine so that the user can manage laundry. In this case, the electronic device 200 may sense the degree of vibration of the washing machine, and the central server 300 may generate status information on the washing machine based on that sensing information. For example, the central server 300 may generate information on the progress of a washing cycle (including wash, drain, rinse, etc.) of laundry, or may generate status information such as completion of the washing.

In another example, as depicted in (c) of FIG. 10A, the electronic device 200 may be placed on a particular object so that the user can find it. In this instance, the electronic device 200 may sense the location of the electronic device 200 by using a tracking sensor, periodically or at set time intervals or upon a request from the central server 300. The central server 300 may generate and output location information (or status information) of an object with the electronic device 200 attached to it, based on location information received from the electronic device 200.

In still another example, as depicted in (d) of FIG. 10A, the electronic device 200 may be placed on an object that requires user privacy protection so that the user can protect their privacy. In this case, the electronic device 200 may sense the movement of the surrounding area of the electronic device 200 or sense an image of when a movement is sensed. The central server 300 may generate status information related to someone else's access to the object with the electronic device 200 attached to it, based on the movement sensing information or image information received from the electronic device 200.

As stated above, in the smart home system according to the present invention, it is possible to establish a smart home system that monitors and controls a home appliance's status by attaching the electronic device 200 to the home appliance, even if the home appliance has no functions of sensing the home appliance's status and sharing this with the central server 300.

Such a smart home system may be applied to various areas, for example, house care, family care, convenience, security, energy saving, and so on, as depicted in FIG. 10B.

In the case of house care, the central server 300 may perform indoor air quality control, comfort control, hazardous gas control, etc. by using information sensed by the electronic device 200.

In the case of family care, the central server 300 may perform elderly care, baby/kid care, activity level management for families, pet care, and so on by using information sensed by the electronic device 200.

In the case of convenience, the central server 300 may perform home appliance management, home appliance control, reminding, and so on by using information sensed by the electronic device 200.

In the case of security, the central server 300 may perform intrusion detection, keeping valuables, fire/danger prevention, and so on by using information sensed by the electronic device 200.

In the case of energy saving, the central server 300 may perform automatic power control, energy saving notification, energy saving reporting, and so on by using information sensed by the electronic device 200.

As stated above, the smart home system according to the present invention allows for monitoring of information on a sensing target of the electronic device 200 via communication between the electronic device 200 and the central server 300. Further, the smart home system according to the present invention may set or control the electronic device 20 by using the mobile terminal 100. Besides, the mobile terminal 100 may use result information sensed by the electronic device 200. Hereinafter, a method of how to make use of the smart home system using the mobile terminal 100 will be described more specifically with reference to the attached drawings. FIGS. 11A, 11B, 11C, and 11D are conceptual diagrams illustrating a method of configuring the settings for an electronic device according to the present invention.

In the smart home system according to the present invention, using a program installed on a mobile terminal, the electronic device 200 may be controlled, or sensing information may be received from the electronic device 200 through the central server 300. Further, sensing information may be received directly from the electronic device 200.

For example, as depicted in (a) and (b) of FIG. 11A, information on a sensing target with the electronica device 200 attached to it may be set up on the mobile terminal 100. Here, the purpose of the electronic device 200 may be specified based on resistance information received from the electronic device 200.

The mobile terminal 100 may receive information on the purpose of the electronic device 200 from the central server 300, and based on this information, may set up detailed information on the electronic device 200, as depicted in (a) and (b) of FIG. 11A. For instance, if a target to be sensed by the electronic device 200 is a washing machine, the controller of the mobile terminal 100 may display a settings screen to let the user select various settings information, such as information on the washing machine, the interval between outputs of sensing information related to the washing machine, how to receive sensing information, the sensing target's functions, whether to share the alarm, and so on.

In this case, the setup of the electronic device 200 may be done through the mobile terminal 100, rather than directly from the central server 300. Once the sensor settings are completed through the mobile terminal 100, information sensed by the electronic device 20 may be viewed through the mobile terminal.

Figure 11B:
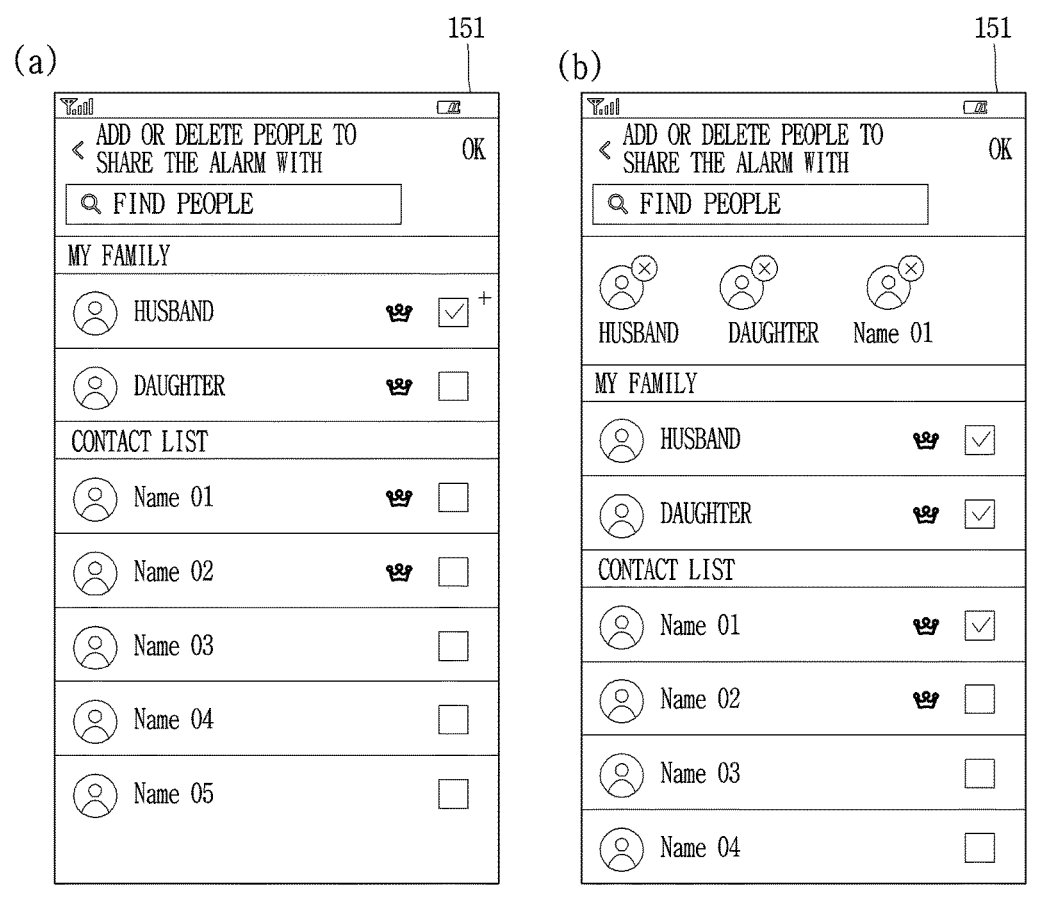

Meanwhile, as depicted in (a) and (b) of FIG. 11B, the smart home system according to the present invention allows for sharing information sensed by the electronic device 200 with other mobile terminals. As used herein, the phrase "other mobile terminals" may refer to other family members' mobile terminals. The settings to share with other mobile terminals may be done through the main mobile terminal 100, and the main mobile terminal 100 may be the first mobile terminal where the settings for the electronic device 200 are configured.

Figure 11C:
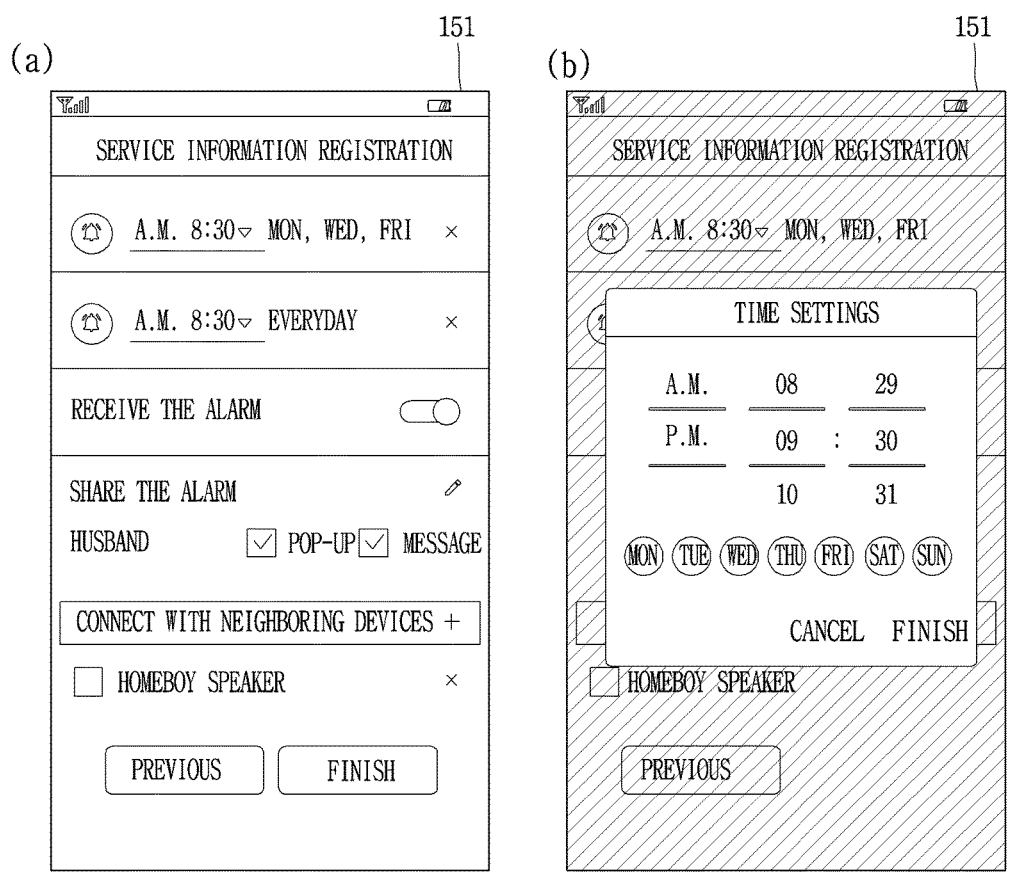

Furthermore, as depicted in (a) and (b) of FIG. 11C, the mobile terminal 100 may set the alarm time and day(s) on which the alarm is received, the time interval between each alarm, how to receive the alarm, and so on. Once the alarm settings are completed, the mobile terminal 100 may receive the settings information by the central server 300, and the central server 300 may control transmission of information received by the electronic device 200, based on the settings information received from the mobile terminal 100.

That is, the central server 300 may determine when and how to send the information received from the electronic device 200 to the mobile terminal 100, based on the settings information.

Contrariwise, the mobile terminal 100 may control the alarm time and how to receive the alarm based on the settings information, even if information sensed by the electronic device 200 is received from the central server 300. That is, the mobile terminal 100 may output the information sensed by the electronic device 200 according to the alarm time and how to receive the alarm which are based on the settings information.

Figure 11D:
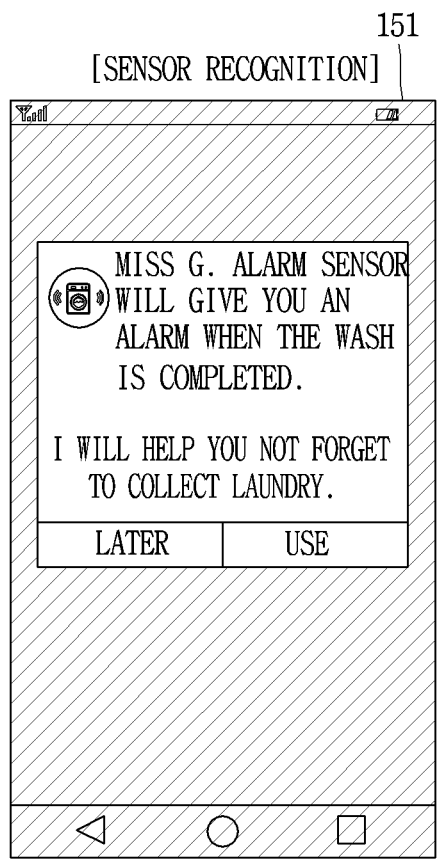

Meanwhile, once the setup of the electronic device 200 is completed on the mobile terminal 100, information sensed by the electronic device 200 may be output on the mobile terminal 100, as depicted in FIG. 11D. Accordingly, through the mobile terminal 100, the user receives information on a sensing target with the electronic device 200 attached to it, thereby establishing a smart home system.

Figure 12A:
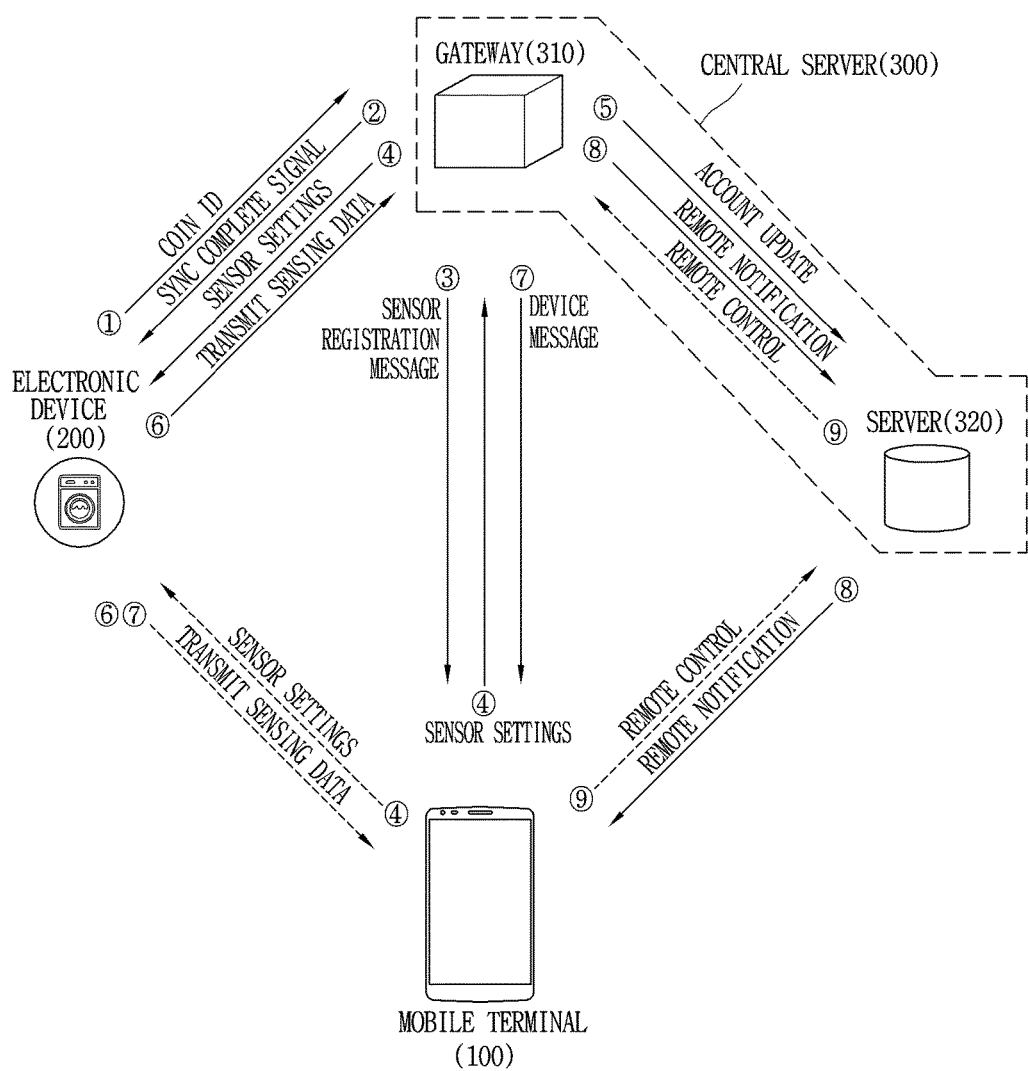
FIGS. 12A and 12B are conceptual diagrams illustrating a smart home system according to the present invention.
Figure 12B:
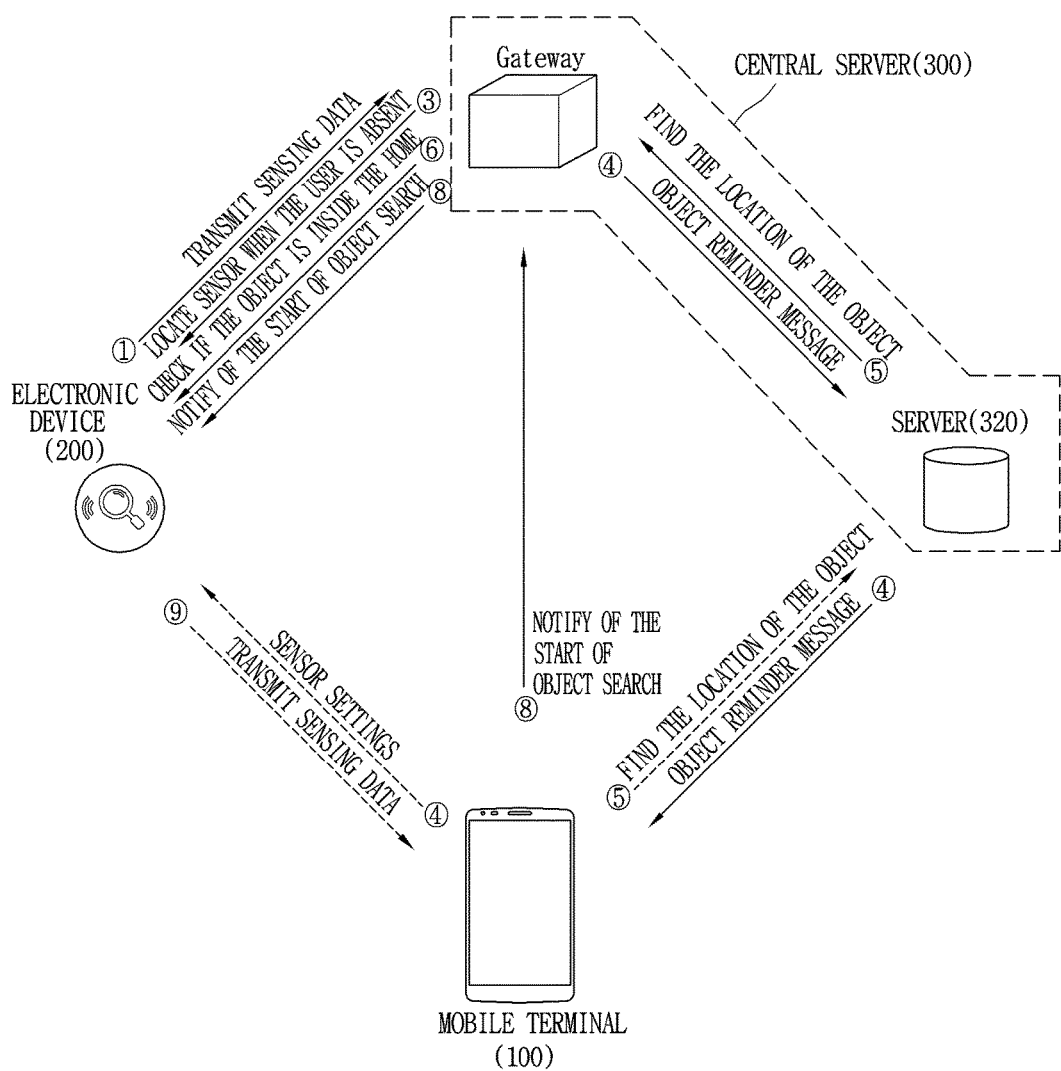

Referring to the flowchart, a method of sensing information on a sensing target via communication among the mobile terminal 100, the electronic device 200, and the central server 300 will now be described in more specific details in conjunction with the attached drawings. FIGS. 12A and 12B are conceptual diagrams illustrating a smart home system according to the present invention.

In an example, FIG. 12A illustrates an example in which the electronic device is a washing machine. First of all, when a cover is attached, the electronic device 200 transmits a resistance value preset for a cover, etc. to the central server 300. Upon receiving the resistance value from the electronic device, the central server 300 transmits a Sync complete signal to the electronic device 200 to inform the electronic device 200 that the electronic device 200 and the central server 300 are connected.

When the electronic device 200 is connected to the central server 300, the central server 300 sends a sensor message to the mobile terminal 100 so that registration of a sensor corresponding to the electronic device and the setup of the electronic device can be done on the mobile terminal 100. In this instance, the mobile terminal 100 may output notification information as a pop-up or the like to indicate that a new electronic device has been detected, and may output a settings screen based on the user's selection so that the settings for the new electronic device 200 are configured immediately.

Then, the mobile terminal 200 transmits to the central server 300 the electronic device's settings that are determined based on the user's selection. Here, the electronic device's settings may include the settings for a sensor in the electronic device. The central server 300 configures the electronic device based on these settings.

The central server 300 may update information on the electronic device that has been newly registered on the user's account.

Next, the electronic device 200 sends sensing information (or sensing data) to the central server 300. Here, the sensing data may include, in the case of a washing machine, data about number of vibrations of the vibration sensor, the intensity, time interval, when vibration occurs, when vibration stops, and regularity of vibrations.

Upon receiving such sensing information, the central server 300 generates status information (or status message) about a sensing target (e.g., washing machine) to be sensed by the electronic device 200. Here, the status information may be information related to operation of the washing machine, including the end of the wash, the start of the wash, the end of the drain, etc.

Once status information is generated, the central server 300 may output the status information through a terminal inside the home or send the status information to a mobile terminal.

In another example, a way to find an object using the electronic device 200 will be described. The electronic device 200 may find out whether the user goes out carrying an object with the electronic device 200 attached to it, and transmit sensor data about this to the central server 300.

Based on this information, the central server 300 learns and monitors when the user goes out carrying the object with the electronic device 200 attached to it, and store information about this.

Then, upon detecting the absence of the user (via communication with the mobile terminal 100), the central server 300 locates the electronic device 200 via communication with the electronic device 200, and upon finding out that the user has gone out, checks if the electronic device 200 is in a preset place (e.g., inside the home).

If the check result shows that the user has gone out without carrying the object with the electronic device 200 attached to it, the central server 300 outputs notification information to the mobile terminal 100 to indicate that the user is not currently carrying the object with the electronic device 200 attached to it.

Upon receiving a request from the user or the user's mobile terminal to find an object with the electronic device 200 attached to it, the central server 300 searches the preset place (e.g., inside the home) for the object with the electronic device 200 attached to it. More specifically, upon receiving a request to find an object from the user, the mobile terminal 100 sends the central server 300 a request to start searching for the object, and the central server 300 to record log information and then change the electronic device 200 to broadcasting mode. In this instance, the electronic device 200 continues to send location information on the electronic device 200 to neighboring devices in a broadcasting manner.

In this case, it is needless to say that the mobile terminal 100 is able to locate the electronic device 200 via direct communication with the electronic device 200.

Figure 13A:
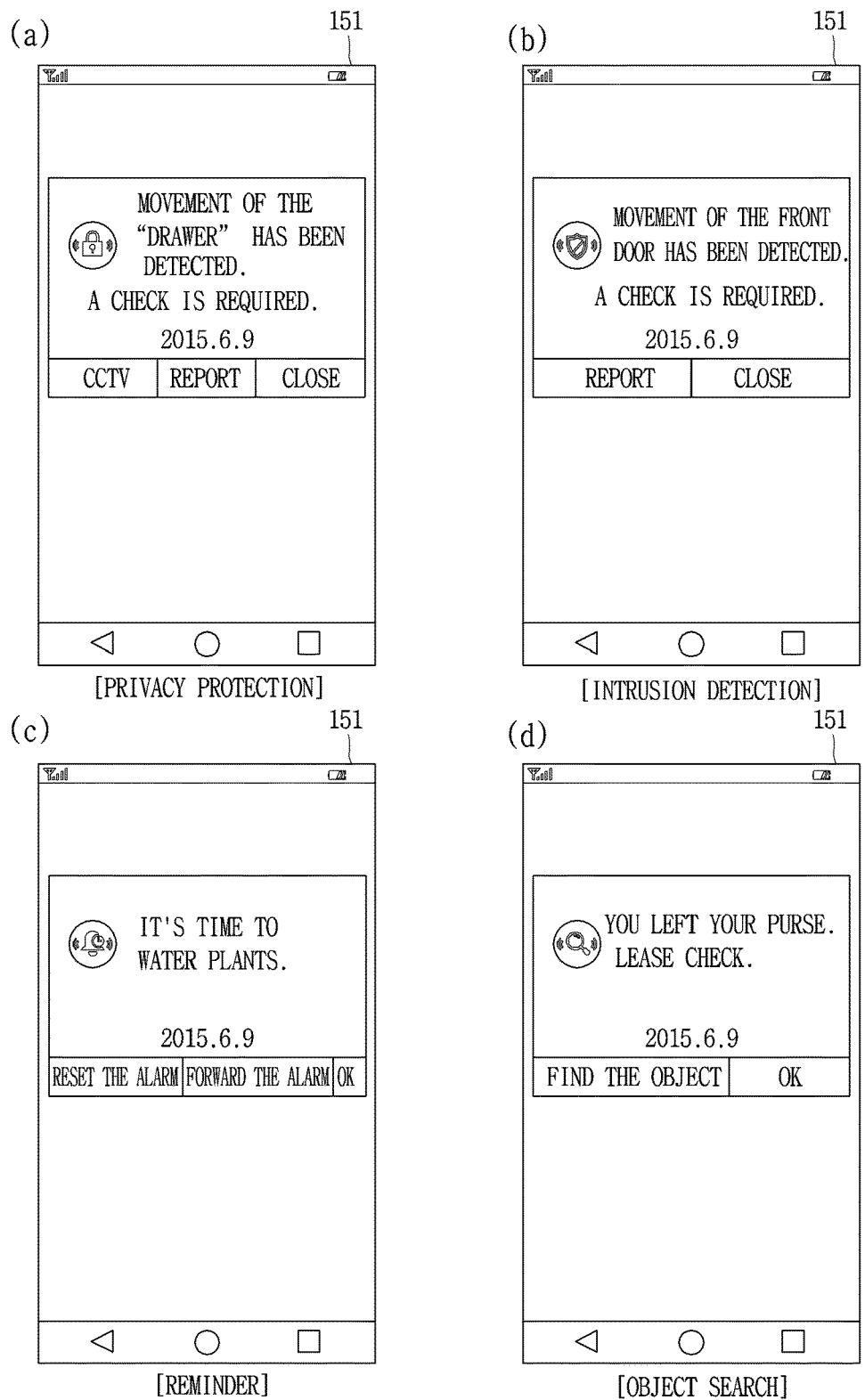
Figure 13B:
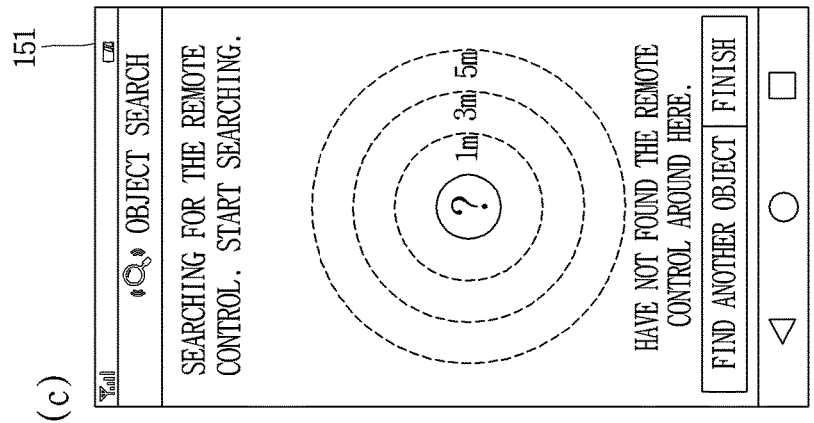
Figure 13B:
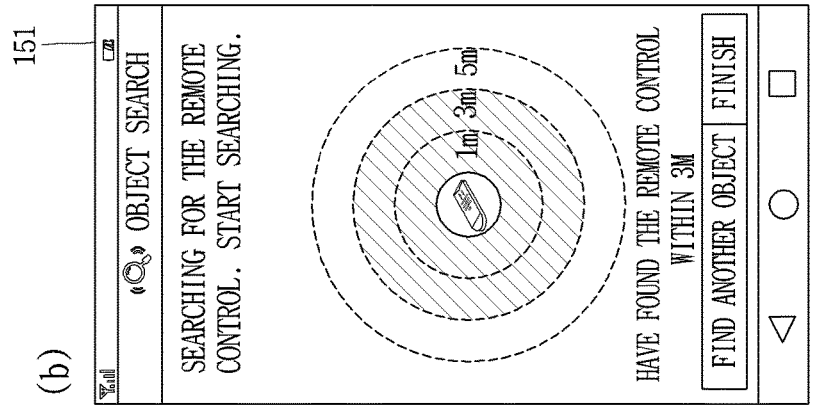
Figure 13B:
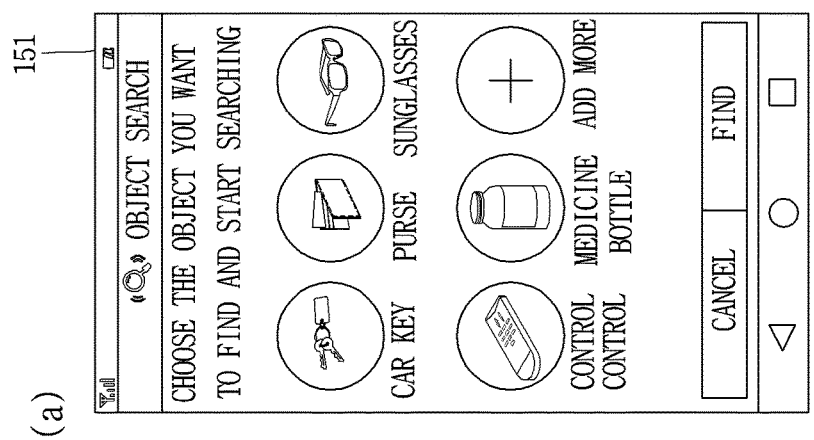

Hereinafter, a method for the mobile terminal to use information on the electronic device will be described more specifically in conjunction with the attached drawings. FIGS. 13A, 13B, and 14 are conceptual diagrams illustrating an example of application of a smart home system according to the present invention.

In the smart home system according to the present invention, status information on a sensing target, which is based on information sensed by the electronic device 200, may be viewed on the mobile terminal 100.

In an example, the central server 300 may transmit status information to the mobile terminal 100, and the controller of the mobile terminal 100 may output the transmitted status, information in various ways through an application installed on the mobile terminal 10. For instance, as depicted in FIG. 13A, the mobile terminal 100 may show a pop-up window of status information on a sensing target based on information sensed by the electronic device 200. Moreover, as well as showing a pop-up window of status information on a sensing target, the controller of the mobile terminal 100 may provide a GUI to perform functions associated with the output status information. That is, the controller of the mobile terminal 100 may show selectable icons or items corresponding to the functions associated with the output status information. Here, the functions associated with the output status information may be determined based on information that matches each piece of status information. Such matching information may be stored and present in the memory of the mobile terminal 100 or in an external storage.

More specifically, as depicted in (a) of FIG. 13A, the controller of the mobile terminal may provide a CCTV surveillance function, a report function, etc., based on status information saying that "Movement of the drawer has been detected".

In another example, as depicted in (b) of FIG. 13A, the controller of the mobile terminal may provide a report function, etc., based on status information saying that "Movement of the front door has been detected".

In another example, as depicted in (c) of FIG. 13A, the controller of the mobile terminal may provide functions like resetting the reminder and sending the reminder to the family members, based on status information "it's time to water plants".

In another example, as depicted in (d) of FIG. 13A, the controller of the mobile terminal may provide functions like finding an object, based on status information "I left my purse".

A method for the mobile terminal to execute the object search function provided by the smart home system according to the present invention will be described. As depicted in (a) of FIG. 13B, graphical objects appear on the mobile terminal, corresponding to sensing targets to which electronic devices 200 providing the object search function are attached. Here, the sensing targets with the electronic devices 200 attached to them may be specified based on the user's settings.

For example, if a car key has a first electronic device attached to it, the user may set the car key as the sensing target corresponding to the first electronic device thorough the mobile terminal 100 or the like. That is, the mobile terminal 100 may set the type of the sensing target corresponding to the first electronic device, based on information input from the user.

In another example, if a purse has a second electronic device attached to it, the user may set the purse as the sensing target corresponding to the second electronic device thorough the mobile terminal 100 or the like. That is, the mobile terminal 100 may set the type of the sensing target corresponding to the second electronic device, based on information input from the user.

Upon receiving a request from the user or the user's mobile terminal to find an object with the electronic device 200 attached to it, the central server 300 searches the preset place (e.g., inside the home) for the object with the electronic device 200 attached to it. More specifically, upon receiving a request to find an object from the user, the mobile terminal 100 sends the central server 300 a request to start searching for the object, and the central server 300 to record log information and then change the electronic device 200 to broadcasting mode. In this instance, the electronic device 200 continues to send location information on the electronic device 200 to neighboring devices in a broadcasting manner.

When the searching is completed, location information on the searched object may appear on the mobile terminal 100, as depicted in (b) of FIG. 13B.

Such location information may be received by the mobile terminal 100 from the central server 300. Alternatively, such location information may be received by the mobile terminal 100 from the electronic device 200.

Even in the case of a failure to find the location of an object, notification information indicating that the location of that object cannot be found may appear on the mobile terminal (c) of FIG. 13B.

Moreover, the smart home system according to the present invention may provide a user interface that enables all-in-one control of the distributed electronic devices 200 by using the mobile terminal 100. As depicted in (a) of FIG. 14, individual items corresponding to a plurality of electronic devices 200 may appear on the mobile terminal 100. Further, the mobile terminal 100 may control the electronic device 200 corresponding to a selected item and the sensing target by making a selection from these items.

Although not shown, the electronic device 200 according to the present invention may have an input part (microphone or camera), etc. so as to receive at least one between voice information or image information. Upon receiving voice information or image information from the user, the electronic device 200 may send it to the central server 300 or a preset mobile terminal 100. The central server 300 may send the voice information or image information to a mobile terminal specified by the user who has inputted the voice information or image information, among a plurality of mobile terminals 100 capable of transmitting information.

In addition, the electronic device 200 may have an output part (speaker or display) so as to output voice information or image information. The electronic device 200 may receive voice information or image information from the central server 300 or the mobile terminal 100, and output the received voice information or image information.

Furthermore, upon detecting the user near the electronic device 200, the electronic device 200 may output voice information or image information. Also, the electronic device 200 may output voice information or image information only when it has detected a designated user through a face recognition function. In this instance, the user who will receive voice information or image information may be designated based on information received from the mobile terminal or the central server.

Although not shown, which functions the electronic device 200 will perform may be determined based on information settings on the mobile terminal 100. That is, the mobile terminal 100 may select functions to be performed by the electronic device 200, and the electronic device 200 may be configured to perform the functions selected by the mobile terminal 100.

For example, the electronic device 200 may be placed in a "bedroom", and the user may select a function to switch on or off lighting in the bedroom so that the electronic device 200 performs this function. The mobile terminal may be set in such a way that, when this function is selected on the mobile terminal, it sends information on the selected function to the electronic device 200 or the central server 300 to have the electronic device 200 perform this function.

In an example, when the user touches the electronic device 200 or pushes a particular button, the electronic device 200 may switch lighting in the bedroom on or off via communication with the lighting.

As such, the smart home system according to the present invention may build a home network by including an electronic device capable of sensing information on a home appliance, even if the home appliance itself is not able to communicate with the central server or the mobile terminal.

An electronic device and a smart home system using the same according to the present invention can specify the purpose according to the resistance of the electronic device. Further, the resistance of the electronic device can be easily changed by user manipulation, so that the user can configure the settings for the electronic device to serve a desired purpose when they first use the electronic device or change the purpose of the electronic device during use.

According to the present invention, since the purpose of the electronic device can be changed only by changing the resistance, there is no need to install an individual electronic device on each home appliance or each particular space the user wants to monitor through the smart home system. Furthermore, according to the present invention, information on a home appliance or particular place not equipped with a function to communicate with the smart home system can be monitored by sensing information on the home appliance or particular place by a sensor in the electronic device. Therefore, there is no need to equip the user's home with a home appliance dedicated to communicating with the central server of the smart home system in order to establish a smart home system.

The present invention can be implemented as computer-readable codes in a program-recorded medium. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the controller 180 of the terminal. Therefore, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

The invention claimed is:

1. An electronic device comprising:
a body portion with an electric circuit;
a wireless communication part provided in the body portion;
a sensor part mounted to the body portion and sensing at least one sensing target;
a cover portion detachably connected to the body portion so as to cover at least part of the body portion and electrically connected to the electric circuit; and
a controller that controls the wireless communication part to transmit to an external device a wireless signal corresponding to a value of a resistance formed by attachment of the cover portion to the body portion and senses information sensed by the sensor part,
wherein a particular home appliance matches the value of resistance formed by the attachment of the cover portion to the body portion, and at least one sensor to be operated among sensors included in the sensor part is determined according to a type of the particular home appliance that matches the value of resistance formed by the attachment of the cover portion to the body portion.

2. The electronic device of claim 1, wherein the sensor part comprises at least one among a proximity sensor, a vibration sensor, a gyro sensor, an acceleration sensor, a temperature sensor, a humidity sensor, and a touch sensor, and an operation of each of the sensors included in the sensor part is determined by the value of the resistance.

3. The electronic device of claim 1, further comprising an output part that outputs at least one between visual information and auditory information,
wherein, if there is event information received from the external device, the controller controls the output part to output the event information, in response to the sensor part sensing of a user's location near the body portion.

4. The electronic device of claim 1, wherein the body portion comprises a first magnetic force member, and the cover portion comprises a second magnetic force member that attaches to the body portion as a magnetic force is applied to the first magnetic force member.

5. The electronic device of claim 4, further comprising a first grounded part provided in a front case of the body portion and electrically connected to the electric circuit of the body portion,
wherein the cover portion further comprises a resistor part having a specified resistance value and a second grounded part electrically connected to the body portion, and
wherein the resistor part is connected to the second grounded part, and the specified resistance value is transmitted to the controller, based on electric connections of the first and second grounded parts by the attachment of the cover portion to the body portion.

6. The electronic device of claim 5, wherein, when the body portion and the cover portion are attached to each other by the first and second magnetic force members, the body portion and the cover portion are electrically connected through the first and second grounded parts, and the specified resistance value of the resistor part is transmitted to the controller, based on the electrical connections of the first and second grounded parts.

7. An electronic device comprising:
a body portion;
a wireless communication part provided in the body portion;
a user input part formed in the body portion and receiving an input specifying an operation mode;
a sensor part provided in the body portion and sensing at least one sensing target associated with the specified operation mode; and a controller that controls the wireless communication part so as to transmit to an external device a wireless signal corresponding to the input specifying the operation mode and sensing information sensed by the sensor part, wherein the controller controls the wireless communication part to transmit at least one sensing value obtained from the sensing information to the external device, and wherein the obtained at least one sensing value is processed at the external device so that the at least one sensing value is associated with the electronic device.

8. The electronic device of claim 7, wherein the body portion comprises a variable resistor part that varies in resistance, and different operation modes match different resistance values of the variable resistor part.

9. The electronic device of claim 8, wherein the resistance of the variable resistor is varied by an input received through the user input part.

10. The electronic device of claim 9, further comprising a display part provided in the body portion and configured to output visual information, wherein the display part outputs information about an operation mode that matches a specific resistance value, based on an input received through the user input part.

11. An electronic device comprising:
a body portion;
a wireless communication part provided in the body portion;
a cover portion detachably connected to the body portion so as to cover at least part of the body portion;
a sensor part provided in the body portion and sensing at least one sensing target; and
a controller that controls the wireless communication part so as to transmit at least one between a first signal and a second signal to an external device,
wherein the first signal is a signal corresponding to sensing information sensed by the sensor part, and the second signal is a signal generated by an attachment of the cover portion,
wherein a particular home appliance matches the value of resistance formed by the attachment of the body portion to the cover portion, and at least one sensor to be operated among sensors included in the sensor part is determined according to a type of the particular home appliance that matches the value of resistance formed by the attachment of the cover portion to the body portion.

12. The electronic device of claim 11, wherein a magnet is mounted to one part of the cover portion, and the sensor part comprises a Hall sensor configured to sense the magnetic field of the magnet, and wherein the second signal is generated based on sensing the magnet field of the magnet mounted to the cover portion.

13. The electronic device of claim 12, wherein the body portion has a plurality of Hall sensors, and the controller determines a position of the magnet mounted to the cover portion by using the Hall sensors.

14. The electronic device of claim 13, wherein the controller runs different operation modes depending on the position of the magnet mounted to the cover portion.

15. A terminal comprising:
a wireless communication part configured to receive from an external device resistance information corresponding to a value of resistance formed by attachment of a cover portion to the external device; and
a controller configured to:
specify a purpose of the external device based on the received resistance information and to generate status information corresponding to the specified purpose of the external device by using sensing information received from the external device that is sensed by a sensor provided in the external device,
control the wireless communication part to receive at least one sensing value obtained from the sensing information from the external device, and
process the sensing value obtained from the at least one sensing value so that the sensing value is associated with the external device.

16. The terminal of claim 15, wherein, if the received resistance information corresponds to a first resistance value, the controller specifies the purpose of the electronic device as a first purpose, and if the received resistance information corresponds to a second resistance value different from the first resistance value, the controller specifies the purpose of the electronic device as a second purpose different from the first purpose.

17. A smart home system comprising:
a first electronic device configured to:
generate a specific signal based on a cover portion attached to cover at least part of the first electronic device, and
transmit the specific signal to the second electronic device; and
a second electronic device configured to:
receive a sensing value obtained from at least one sensing target from the first electronic device, and
specify a type of an external device associated with the first electronic device by using the specific signal,
process the sensing value obtained from the at least one sensing value so that the sensing value is associated with the specific external device.

18. The smart home system of claim 17, wherein, in the processing of the sensing value, status information corresponding to the type of the specified external device is generated based on the sensing value, and the generated status information is transmitted to a third electronic device different from the first and second electronic devices.

19. The smart home system of claim 18, wherein the third electronic device transmits to the second electronic device the settings for a sensor provided in the first electronic device that are determined based on the user's selection, the second electronic device controls the sensor provided in the first electronic device based on the settings for the sensor provided in the first electronic, and the first electronic device is run based on the settings determined by the third device.

* * * * *